(12) United States Patent
Van Den Brink et al.

(10) Patent No.: US 9,748,774 B2
(45) Date of Patent: Aug. 29, 2017

(54) SYSTEM AND METHOD FOR BIDIRECTIONAL WIRELESS POWER TRANSFER

(71) Applicant: Access Business Group International LLC, Ada, MI (US)

(72) Inventors: Joseph C. Van Den Brink, Coopersville, MI (US); Joshua B. Taylor, Rockford, MI (US); Matthew J. Norconk, Grand Rapids, MI (US); Colin J. Moore, Grand Rapids, MI (US); Benjamin C. Moes, Wyoming, MI (US); Neil W. Kuyvenhoven, Ada, MI (US); David W. Baarman, Fennville, MI (US)

(73) Assignee: Access Business Group International LLC, Ada, MI (US)

( * ) Notice: Subject to any disclaimer, the term of this patent is extended or adjusted under 35 U.S.C. 154(b) by 306 days.

(21) Appl. No.: 14/426,579

(22) PCT Filed: Mar. 14, 2013

(86) PCT No.: PCT/US2013/031132
§ 371 (c)(1),
(2) Date: Mar. 6, 2015

(87) PCT Pub. No.: WO2014/039088
PCT Pub. Date: Mar. 13, 2014

(65) Prior Publication Data
US 2015/0244176 A1 Aug. 27, 2015

(51) Int. Cl.
*H01F 38/00* (2006.01)
*H02J 5/00* (2016.01)
(Continued)

(52) U.S. Cl.
CPC ............ *H02J 5/005* (2013.01); *H04B 5/0037* (2013.01); *H04B 5/0093* (2013.01); *H02J 7/025* (2013.01);
(Continued)

(58) Field of Classification Search
None
See application file for complete search history.

(56) References Cited

U.S. PATENT DOCUMENTS

| 4,533,988 A | 8/1985 | Daly et al. |
| 5,510,972 A | 4/1996 | Wong |

(Continued)

FOREIGN PATENT DOCUMENTS

| JP | 2008011584 | 1/2008 |
| WO | 03/105311 | 12/2003 |

(Continued)

OTHER PUBLICATIONS

Koji Kotani and Takashi Ito, "High Efficiency CMOS Rectifier Circuits for UHF RFIDs Using Vth Cancellation Techniques", IEEE, published Oct. 20, 2009, pp. 549-552.

(Continued)

*Primary Examiner* — Lincoln Donovan
*Assistant Examiner* — Khareem E Almo
(74) *Attorney, Agent, or Firm* — Warner Norcross & Judd LLP

(57) ABSTRACT

The present invention relates to a wireless power supply system including a remote device capable of both transmitting and receiving power wirelessly. The remote device includes a self-driven synchronous rectifier. The wireless power supply system may also include a wireless power supply configured to enter an OFF state in which no power, (Continued)

or substantially no power, is drawn, and to wake from the OFF state in response to receiving power from a remote device.

39 Claims, 27 Drawing Sheets

(51) Int. Cl.
  *H04B 5/00* (2006.01)
  *H02J 7/02* (2016.01)
  *H02M 3/335* (2006.01)
  *H02J 7/00* (2006.01)

(52) U.S. Cl.
  CPC .. *H02J 2007/0096* (2013.01); *H02M 3/33584* (2013.01); *Y02B 40/90* (2013.01)

(56) References Cited

U.S. PATENT DOCUMENTS

| | | | |
|---|---|---|---|
| 6,275,401 B1 | 8/2001 | Xia | |
| 6,421,262 B1 | 7/2002 | Saxelby et al. | |
| 6,563,726 B1 | 5/2003 | Hirst | |
| 7,120,036 B2 | 10/2006 | Kyono | |
| 2002/0154518 A1 | 10/2002 | Elferich et al. | |
| 2009/0257259 A1 | 10/2009 | Leibovitz | |
| 2010/0148723 A1* | 6/2010 | Cook | G06K 7/0008 320/108 |
| 2012/0039102 A1 | 2/2012 | Shinoda | |
| 2012/0187772 A1 | 7/2012 | Teggatz et al. | |
| 2014/0132077 A1* | 5/2014 | Nalbant | H02M 1/38 307/104 |
| 2014/0265610 A1* | 9/2014 | Bakker | H02J 7/025 307/104 |
| 2014/0302782 A1* | 10/2014 | Raab | H04B 5/0037 455/41.1 |
| 2015/0035372 A1* | 2/2015 | Aioanei | H02J 7/025 307/104 |
| 2015/0102685 A1* | 4/2015 | Blood | H02J 5/005 307/104 |
| 2015/0244176 A1* | 8/2015 | Van Den Brink | H02J 5/005 307/104 |
| 2016/0087471 A1* | 3/2016 | Wilson | H02J 50/12 307/104 |
| 2016/0094041 A1* | 3/2016 | Aioanei | H02J 5/005 307/104 |
| 2016/0094042 A1* | 3/2016 | Maniktala | H02J 50/12 307/104 |
| 2016/0094043 A1* | 3/2016 | Hao | H01F 38/14 307/104 |
| 2016/0218520 A1* | 7/2016 | Mehas | H02J 50/12 |
| 2016/0218559 A1* | 7/2016 | Mehas | H02J 5/005 |

FOREIGN PATENT DOCUMENTS

| | | |
|---|---|---|
| WO | 2010/028092 | 3/2010 |
| WO | 2010/057224 | 5/2010 |
| WO | 2010/062198 | 6/2010 |
| WO | 2010/083514 | 7/2010 |
| WO | 2010125864 | 11/2010 |
| WO | 2011/007300 | 1/2011 |
| WO | 2012/090030 | 7/2012 |

OTHER PUBLICATIONS

International Search Report and Written Opinion of the International Searching Authority for International Application No. PCT/US2013/031132 mailed on Oct. 9, 2013.

* cited by examiner

SYSTEM AND METHOD FOR BIDIRECTIONAL WIRELESS POWER TRANSFER

BACKGROUND OF THE INVENTION

The present invention relates to wireless power transfer, and more particularly to bidirectional power transfer to and from a remote device.

There has been an ever increasing presence of remote devices in public use. Remote devices such as mobile phones, digital music players, tablets, personal digital assistants, sensors and other similar electronic devices have become nearly ubiquitous in many parts of the world.

As the presence of these types of remote devices increases, their design and feature set changes and advances from one product cycle to the next. In particular, the power interface for charging or powering remote devices has advanced in many respects. Several early remote devices were designed to receive power from a power supply, such as a an AC adapter, via a cord and connector interface. However, these conventional connector interfaces suffer from a variety of drawbacks. The connector interface in some instances is a proprietary interface, which can become a barrier to interoperability with other remote devices. Connector interfaces also may leave electrical contacts exposed so that environmental factors, such as exposure to water, can damage the remote device. And, these interfaces are often prone to mechanical failure.

To address these issues, wireless power interfaces have been utilized more recently to remove the cord and connector interface. Wireless power interfaces may take advantage of coupling between a primary (also known as a transmitter, a primary coil, or a primary inductor) and a secondary (also known as a receiver, a secondary coil, or a secondary inductor) in order to transfer power from a power supply to a remote device without electrical contacts or without a cord and connector interface. For example, wireless power transfer to a remote device may be achieved by energizing a primary such that it inductively couples with a secondary incorporated in the remote device.

With the proliferation of remote devices capable of receiving wireless power, it has been recognized by some that remote devices may be capable of transmitting wireless power in addition to receiving wireless power. Practically speaking, there are some similarities between conventional wireless power supplies and remote devices that make such bidirectional power transfer possible. Both, for example, include a coil in many configurations, which can be used as both a secondary and a primary. However, there are some differences: conventional wireless power supplies include drive circuitry to energize the primary whereas conventional remote devices include passive rectification circuitry to condition power received in the secondary.

To complement the increase in remote devices capable of receiving wireless power, wireless power supplies, such as charging bases, have become more commonplace. Unlike cord and connector interfaces, which use wall power, conventional wireless power supplies often remain idle while awaiting a remote device to power. While idle, the power supply may draw constant power from its power source. This constant draw, though small, may amount to a large waste of energy over long periods or when compounded by multiple power supplies being left idle. There have been solutions to minimize this waste, but none appear to substantially or completely eliminate this waste. For example, some systems have been developed to include supervisors that shut down the power supply for a period of time, but in these systems some circuitry remains on and still draws power, including for example the supervisor and converter circuitry.

SUMMARY OF THE INVENTION

The present invention provides a wireless power supply system including a remote device capable of both transmitting and receiving power wirelessly. The remote device in one embodiment may include a self-driven synchronous rectifier.

In one embodiment, the wireless power supply system may include a wireless power supply configured to enter an OFF state in which no power or substantially no power is drawn, and to wake from the OFF state in response to receiving power from a remote device. The remote device of the wireless power supply system in this embodiment may or may not include a self-driven synchronous rectifier.

In one embodiment, the remote device may be capable of receiving wireless power in a receive mode and transmitting wireless power in a transmit mode. The remote device may include a power transceiver configured to both generate electrical power in response to a field generated by a wireless power supply and transfer wireless power in response to being driven. The remote device may also include wireless power transceiver circuitry coupled to the transceiver and being configurable between the receive mode and the transmit mode. In the transmit mode, the wireless power transceiver circuitry may be capable of driving the transceiver to transfer wireless power, and in the receive mode, the wireless power transceiver circuitry may be capable of rectifying the electrical power received in the transceiver. In one embodiment, the wireless power transceiver circuitry includes self-driven synchronous rectification circuitry that may, for example, allow the remote device to operate without a controller or without being controlled by one.

In one embodiment, the remote device may include a controller to monitor the wireless power transceiver circuitry and to control the wireless power transceiver circuitry. For example, the controller may configure the wireless power transceiver circuitry to rectify power in one or more modes, including at least one of full-synchronous mode, semi-synchronous mode, discontinuous mode, and diode rectification mode. The remote device may also include a sensor adapted to sense a characteristic of power in the transceiver. This sensed characteristic may be used by the controller to determine whether to configure the remote device in a transmit mode or a receive mode. For example, the sensed output of the sensor may be indicative of another device transmitting power, and based on this information, the controller may determine to configure the remote device into the receive mode. As another example, the sensed output may be indicative of presence of another device in proximity to the remote device.

In one embodiment, the remote device may include a communication system capable of communicating with another device, such as the wireless power supply or another remote device. The communication system may enable the remote device to exchange power information with the other device. This power information may be used to determine whether to enter the transmit mode or the receive mode.

In one embodiment, the remote device may include a plurality of transceivers. One or more of these transceivers may be selectively activated depending on a variety of factors, including the mode of operation and the inductance of the transceiver. For example, in a transmit mode, one transceiver may be activated but, in receive mode, that same transceiver may be deactivated while another transceiver is activated. In one embodiment, one or more of the transceivers may operate as a resonator that couples with another transceiver in the remote device, enabling transmission or reception of wireless power.

In one embodiment, the remote device may include a two-quadrant power supply capable of operating in a boost mode in the transmit mode and operating in a buck mode in the receive mode. For example, in the transmit mode, the two-quadrant power supply may boost the voltage of the remote device's battery to levels sufficient for efficient power transmission. And in receive mode, the two-quadrant power supply may reduce the rectified voltage output from the wireless power transceiver circuitry to a level appropriate for charging the battery of the remote device or powering the load of the remote device.

In one aspect, the present invention may include a wireless power supply for transferring power to at least one remote device. The wireless power supply may include a primary for transferring power to the at least one remote device and converter circuitry configured to receive power from a power source and provide power to the primary. The wireless power supply may also include power saving circuitry capable of selectively enabling transmission of power from the power source in response to the primary receiving wireless power. For instance, the wireless power supply may remain in a disabled or OFF state while waiting for an indication that a remote device would like to receive wireless power. The remote device may provide such an indication by transmitting power to the wireless power supply, which in turn may begin transmitting wireless power back to the remote device.

In one embodiment, the wireless power supply may also be capable of selectively enabling transmission of power in response to events other than reception of wireless power in the primary. For example, a user may press a button to activate the wireless power supply or an external controller, such as a vehicle ignition system, may turn ON the wireless power supply.

In one aspect, the present invention provides a simple and effective system for reducing or eliminating power draw in a wireless power supply while it remains idle. For example, if the wireless power supply is in an environment in which it spends a large amount of time in standby, such as in an office area or the home, power draw during this standby time may be reduced or eliminated. In another aspect, the present invention may provide an effective system for a remote device to alternately transmit or receive power. For example, the remote device may receive power in some circumstances without a controller or without sufficient power to initially operate a controller.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

A. Overview

Figure 1:
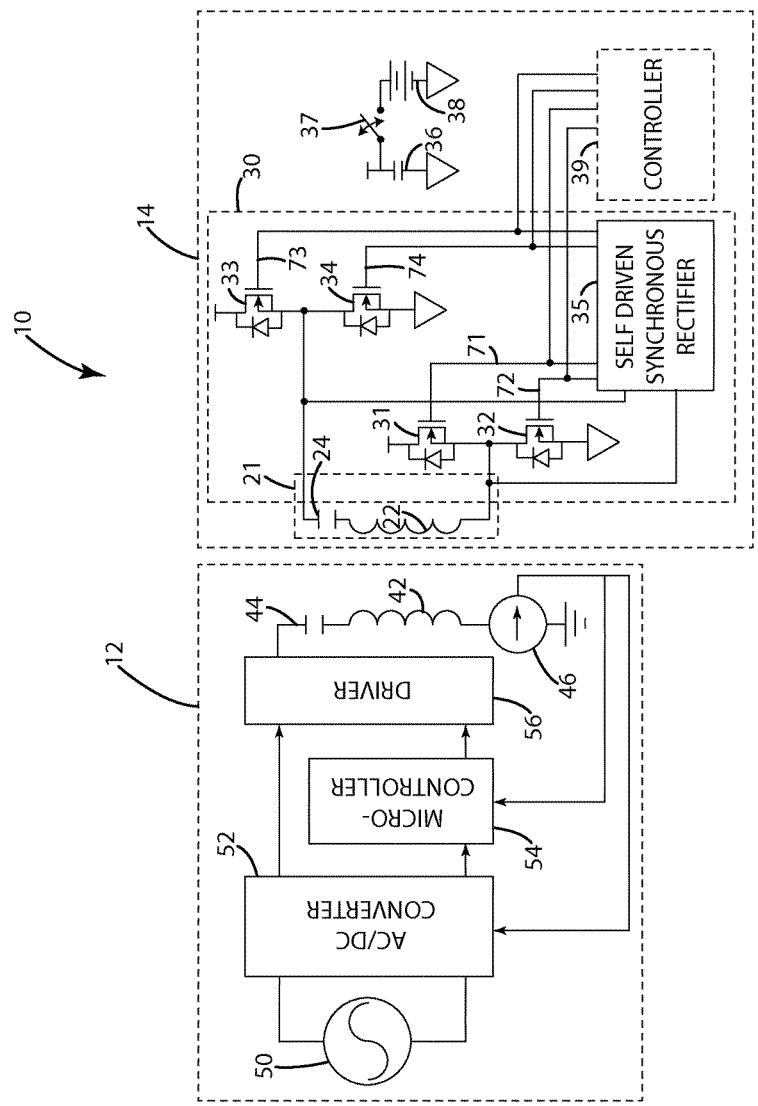
FIG. 1 is a schematic representation of a wireless power supply and a remote device in accordance with an embodiment of the present invention.

The present invention is directed to a wireless power supply system including a remote device capable of both transmitting and receiving power wirelessly. The wireless power supply system may also include a wireless power supply configured to enter an OFF state in which no power, or little power, is drawn and configured to wake from the OFF state in response to receiving power from a remote device in proximity to the inductive power supply. For purposes of disclosure, the wireless power supply system is described in large part in connection with one remote device, but it should be understood that a plurality of remote devices may be used in the wireless power supply system. And though described in connection with a remote device having a generic load, the present invention is well-suited for use in mobile phones, digital music players, tablets, personal digital assistants, low power electronic sensors and other similar electronic devices.

The remote device may include wireless power transceiver circuitry configurable between two modes: a receive mode and a transmit mode. Operation according to one of these modes may depend on whether the remote device is receiving or transmitting wireless power. If the remote device is receiving wireless power, the wireless power transceiver circuitry may rectify power received in a transceiver to power usable by other circuitry in or connected to the remote device. On the other hand, if the remote device is transmitting wireless power, the wireless power transceiver circuitry may drive or energize the transceiver to inductively couple with another device, such as an inductive power supply or another remote device. In one embodiment, the wireless power transceiver circuitry may be configured to rectify power in a self-driven synchronous manner such that the remote device may rectify power without the aid of a controller.

In one embodiment, the wireless power supply may enter an ON state in response to receiving an input, such as receiving wireless power from a remote device. With this construction, the wireless power supply may conserve power by remaining in an OFF state, reducing power consumption, until a remote device or a user provides an indication to transmit wireless power.

B. System

A wireless power supply system in accordance with an embodiment of the present invention is shown in FIGS. 1-8 and designated 10. The wireless power supply system 10 includes a remote device 14 configured to receive and transmit wireless power. The wireless power supply system 10 may also include a power supply 10, one or more additional remote devices 14, 14', or both—any of which may be configured to receive and transmit wireless power, to receive wireless power only, or to transmit wireless power only. For example, the remote device 14 may operate in conjunction with a conventional wireless power supply, conventional remote devices, or both.

The remote device 14 may include a generally conventional electronic device, such as a cell phone, a media player, a handheld radio, a camera, a flashlight or essentially any other portable electronic device. The remote device 14 may include an electrical energy storage device, such as a battery, capacitor or a super capacitor, or it may operate without an electrical energy storage device. The components associated with the principle operation of the remote device 14 (and not associated with wireless power transfer) are generally conventional and therefore will not be described in detail. Instead, the components associated with the principle operation of the remote device 14 are generally referred to as a principle load or a battery 38. For example, in the context of a cell phone, no effort is made to describe the electronic components associated with the cell phone itself. Although described in connection with a battery 38, it should be understood that the remote device may not include a battery 38 and that the battery 38 may be a load.

The remote device 14 includes a transceiver 21 having a secondary 22 and a resonant capacitor 24 arranged to form a series resonant tank circuit capable of both receiving as well as transmitting wireless power. The present invention is not limited to use with series resonant tank circuits and may instead be used with other types of resonant tank circuits and even with non-resonant tank circuits, such as a simple inductor without a matching capacitance. Alternative embodiments, which will be described in further detail below, may also include a resonator circuit capable of operating in conjunction with the transceiver 21 to receive and transmit wireless power.

The remote device 14 according to a current embodiment includes wireless power transceiver circuitry 30 configurable between two modes. In a receive mode, the wireless power transceiver circuitry 30 may be configured as a rectifier to produce a rectified output based on wireless power received in the secondary 22. And in a transmit mode, the wireless power transceiver circuitry 30 may be configured as an inverter capable of being driven to transmit wireless power from the transceiver 21.

The remote device 14 may also include a switch 37 and a capacitor 36. Because the power initially received by the remote device 14 may be insufficient to charge the battery 38 or power the load, the switch 37 and capacitor 36 may operate to buffer against low power conditions or to control charging of the battery 38. For example, once the voltage output from the wireless power transceiver circuitry 30 reaches an appropriate level, the switch 37 may be closed enabling charging of the battery 38 or to power the load. The switch may also be opened in some circumstances to disconnect the wireless power transceiver circuitry 30 from the battery 38 so that energy is not unnecessarily sapped from the battery 38.

Although the illustrated embodiments of FIGS. 1-8 are described in connection with specific rectifier topologies, the wireless power transceiver circuitry 30 may include circuitry capable of any type of rectification—e.g., converting alternating current in the transceiver 21 to direct current used by the remote device 14. Such circuitry may comprise diodes, switches, or any combination thereof to provide one or more modes of rectification, including, for example, diode rectification, semi-synchronous rectification, discontinuous mode rectification, and full-synchronous rectification. For instance, if the wireless power transceiver circuitry 30 includes a simple full bridge diode rectifier, then diode rectification may be used, though it may not be possible to reconfigure the wireless power transceiver circuitry 30 for other modes of rectification. And if the wireless power transceiver circuitry 30 includes both diodes and switches, it may be possible to use at least one of semi-synchronous rectification and full synchronous rectification. Discontinuous mode rectification, full-synchronous rectification, or both may be used if the wireless power transceiver circuitry 30 includes switches without diodes for rectification.

The wireless power transceiver circuitry 30 in the illustrated embodiments of FIGS. 1-7 includes a plurality of switches 31-34 capable of being switched to rectify wireless power received in the transceiver 21. Control of the switches may be carried out in a self-driven manner with self-drive circuitry 35 or by a controller 39, or both.

In the illustrated embodiment, each switch 31-34 is a MOSFET having a body diode, but any type of switch may be used, including for example diodes, MOSFETs without body diodes, Bipolar Junction Transistors (BJT), and Insulated Gate Bipolar Transistors (IGBT). In the illustrated embodiment, switches 31-34 are arranged in a bridge with two branches, each of which includes a high-side switch 31, 33 and a low side switch 32, 34 connected to one side of the transceiver 21. This configuration may allow the switches 31-34 to operate as a synchronous or active rectifier in one or more modes. For example, in full-synchronous mode, gates 71-74 of the switches 31-34 may be controlled, respectively, so that switches 31-34 operate in a manner similar to a full-wave bridge diode rectifier by ensuring that each switch 31-34 is open or closed at an appropriate time to allow current flow in the appropriate direction. Other modes, such as a discontinuous mode, a semi-synchronous mode, or a diode rectification mode may be achieved using the same or alternative rectifier circuit topologies—which are described in further detail herein.

Figure 2:
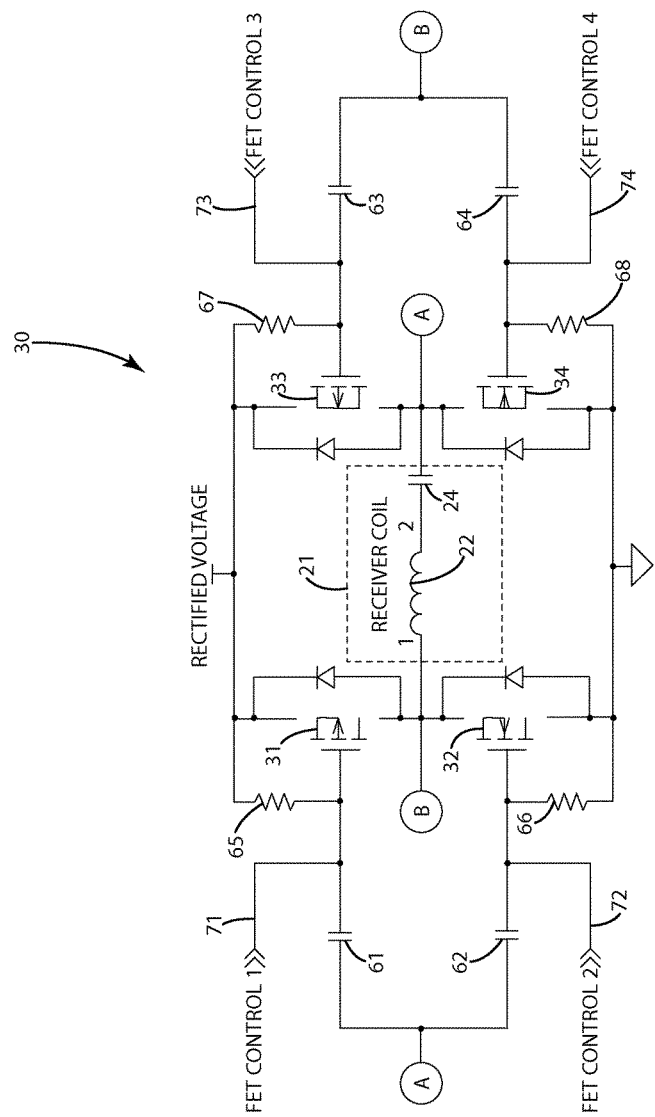
FIG. 2 is a schematic representation of a wireless power transceiver circuit of a remote device in accordance with an embodiment of the present invention.
Figure 3:
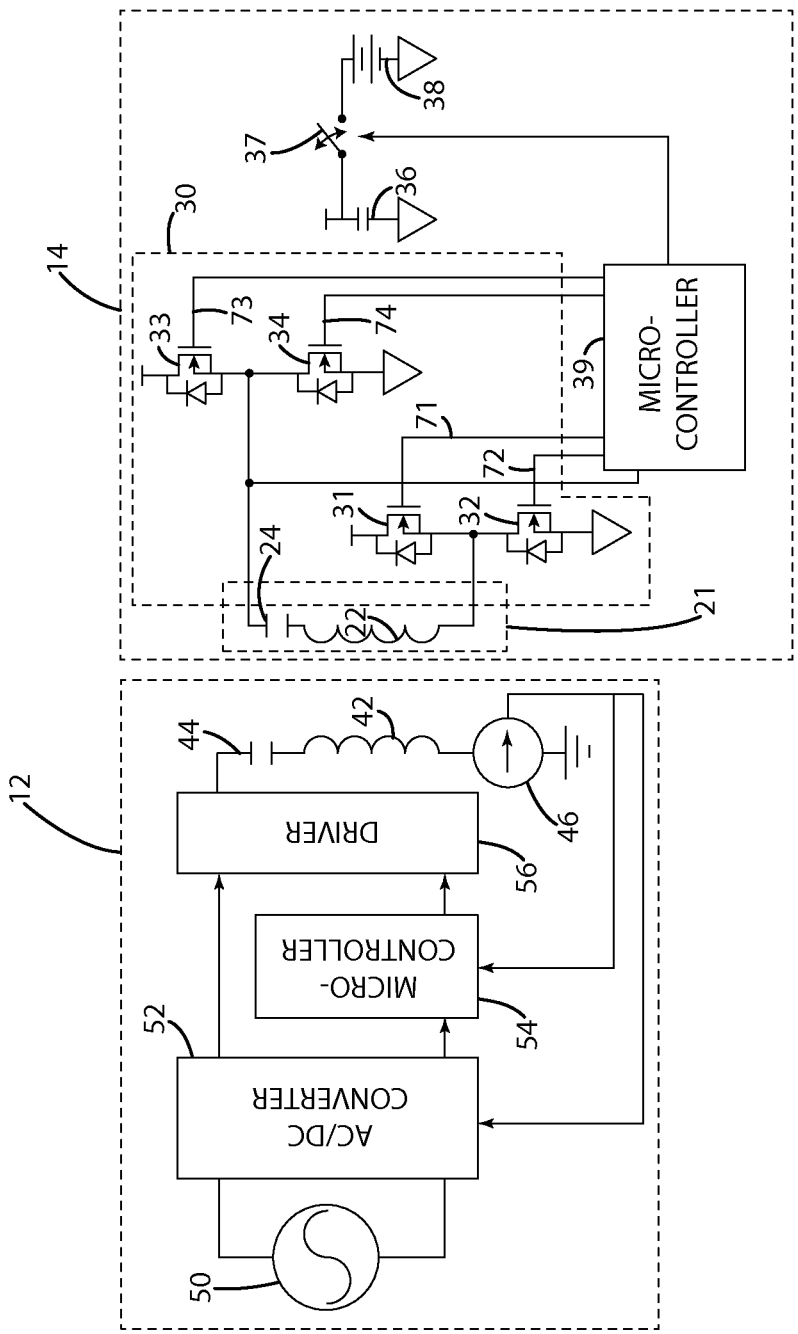
FIG. 3 is a schematic representation of the wireless power supply and the remote device in accordance with an embodiment of the present invention.

Turning specifically to the illustrated embodiment of FIGS. 1 and 2, the wireless power transceiver circuitry 30 may include self-drive circuitry 35 configured for self-driven synchronous rectification in the receive mode such that the wireless power transceiver circuitry 30 may produce a rectified output without being controlled by a controller 39. For example, the controller 39 may not be incorporated into the remote device 14. It should be understood that although capable of operating without a controller 39, the remote device 14 may include a controller 39 adapted to at least one of control and monitor the wireless power transceiver circuitry 30 in an alternative embodiment, and that the controller 39 may be used with or without the self-drive circuitry 35. For example, the illustrated embodiment of FIG. 3 shows one embodiment with wireless power transceiver circuitry 30 controlled by a controller 39 to produce a rectified output without self drive circuitry 35. The controller 39 may also incorporate a communication system that enables one or two-way communication with other devices. Communication may occur via a channel separate from the transceiver 21 or over an inductive coupling with the transceiver 21. This communication system may be integrated into the controller 39 or implemented in circuitry separate from the controller 39.

The self-drive circuitry 35 of the wireless power transceiver circuitry 30 may help to achieve self-driven synchronous rectification. For example, the self-drive circuitry 35 may include analog circuitry configured to control timing of the gates 71-74 of the switches 31-34 to achieve synchronous rectification without a controller. One such example is shown in further detail in the illustrated embodiment of FIG. 2. As shown, the transceiver 21 and switches 31-34 are arranged in a topology similar to that of FIG. 1. The illustrated embodiment also includes self-drive circuitry, shown dispersed throughout the circuit for clarity, having capacitors 61-64 and bias resistors 65-68. The capacitors 61-64 may couple the gates 71-74 of the switches 31-34 to the opposite branch or leg of the wireless power transceiver circuitry 30 to create the appropriate gate charge on the switches 31-34 for turning them ON or OFF. The bias resistors 65-68 may be coupled to the high or low rectified voltage and may be used to help turn the switches 31-34 OFF quickly enough to prevent the switches 31-34 from staying ON too long, possibly shorting out the rectified voltage.

Although the self-drive circuitry in the illustrated embodiment of FIG. 2 may be configured to avoid shorting the rectified voltage, there may be circumstances such as light loads or very high coupling in which the switches 31-34 may turn off too slowly or on too quickly. In an alternative embodiment in which the remote device 14 includes a controller, such as the controller 39 in the illustrated embodiment of FIG. 3, the controller may be coupled to the wireless power transceiver 30 to control the gates 71-74, and may potentially be configured to further avoid shorting the rectified voltage. The controller 39 in particular may monitor and control operation of the wireless power transceiver 30 in the rectification mode. For example, the controller 39 may disable either the upper switches 31, 33 or the lower switches 32, 34 by controlling their gate charge (either directly or through a driver or reference voltage). By disabling either the upper switches 31, 33 or the lower switches 32, 34, the controller 39 may be capable of forcing the wireless power transceiver circuitry 30 into a semi-synchronous rectification mode. If the four switches 31-34 are disabled, a full-wave diode bridge rectification mode may be achieved through body diodes associated with each switch 31-34 or through external diodes. In yet another alternative embodiment, zener diodes (not shown) may be included to prevent the voltage at the gates 71-74 of the switches 31-34 from damaging the switches 31-34.

In the illustrated embodiment of FIGS. 3-7, the remote device 14 includes a controller 39 adapted to control synchronous rectification of the switches 31-34 in the receive mode without self-drive circuitry. The controller 39, as mentioned herein, may supplement or replace the self-drive circuitry 35 of the wireless transceiver circuitry 30 in the illustrated embodiment of FIGS. 1-2. The controller 39 may comprise a microcontroller or analog circuitry, or a combination thereof, configured to control rectification in one or more modes, such as full-synchronous, semi-synchronous, discontinuous, and diode rectification modes. Full-synchronous mode operation is described above with respect to FIGS. 1-2.

Discontinuous, semi-synchronous, and diode rectification modes will now be described in further detail with respect to the illustrated embodiments of FIGS. 1-7 and various alternative embodiments of the wireless power transceiver circuitry 30.

In discontinuous mode, four switches 31-34 may be used, as in the full-synchronous mode described with respect to the illustrated embodiments of FIGS. 1-2, but, for example, all of the switches 31-34 may be turned OFF for a portion of the current cycle. This switch timing may result in recirculating current in the secondary 22 to suddenly go to zero, or in other words, current may no longer flow in a continuous manner in the secondary 22. By implementing discontinuous mode rectification, the rectified voltage output from the wireless power transceiver circuitry 30 may be reduced without having to communicate to the wireless power supply 12. In this way, the remote device 14, itself, may control how much power it receives. It should be understood that, in an alternative embodiment, the remote device 14 may still communicate information to the wireless power supply, including, for example, information relating to a power demand, a power requirement, or power usage.

In semi-synchronous mode, the wireless power transceiver circuitry 30 may include two high-side switches 31, 33 or two low-side switches 32, 34 connected, respectively, to either the negative or positive terminal of the transceiver 21 to reduce the voltage drop across the rectifier elements. Diodes may be used as the opposite rectifier elements (e.g., to replace either the high-side switches 31, 33 or the low-side switches 32, 34). As mentioned in conjunction with the illustrated embodiments of FIGS. 1 and 2, semi-synchronous mode may be achieved using diode rectification in the upper or lower portion of each branch of the bridge and active rectification in the opposite portion of each branch.

In diode rectification mode, the wireless power transceiver circuitry 30 may include a full-wave bridge diode rectification topology (e.g., an arrangement of four or more diodes in a bridge circuit configuration with two circuit branches) to allow current flowing in one branch in one direction to pull current from the negative—or zero reference—terminal of the rectifier through a lower diode, and to push current through an upper diode to the positive terminal. When the current polarity reverses, current may flow through the opposite diodes in the other branch in the same manner but in a different direction from the positive terminal to the negative terminal.

It should be understood that the body diodes of the switch topology described with respect to FIGS. 1-7 may be used in diode rectification mode. However, if the wireless power transceiver circuitry 30 includes a four switch 31-34 rectifier with four diodes (e.g., body diodes), each in parallel with one switch 31-34, the wireless power transceiver circuitry 30 may be unable to run in discontinuous mode because with the switches 31-34 turned OFF, recirculating current flows through the diodes instead. In many cases, this reduces the operating efficiency rather than reducing the rectified voltage. To prevent conduction through diodes associated with the switches 31-34, the wireless power transceiver circuitry 30 may include back to back switches in place of each switch 31-34, such as back to back MOSFETs where the gates of the MOSFETs are tied together and either the sources or drains are also tied together.

In an alternative embodiment, the wireless power transceiver circuitry 30 may not include switches 31-34 configured as a synchronous rectifier. For example, the wireless power transceiver circuitry 30 in one alternative embodiment may include a diode rectifier, such as a full-wave bridge rectifier or a half-wave rectifier, to rectify power in the receive mode and switches, similar to switches 31-34, capable of energizing the transceiver 21 in the transmit mode.

Figure 32:
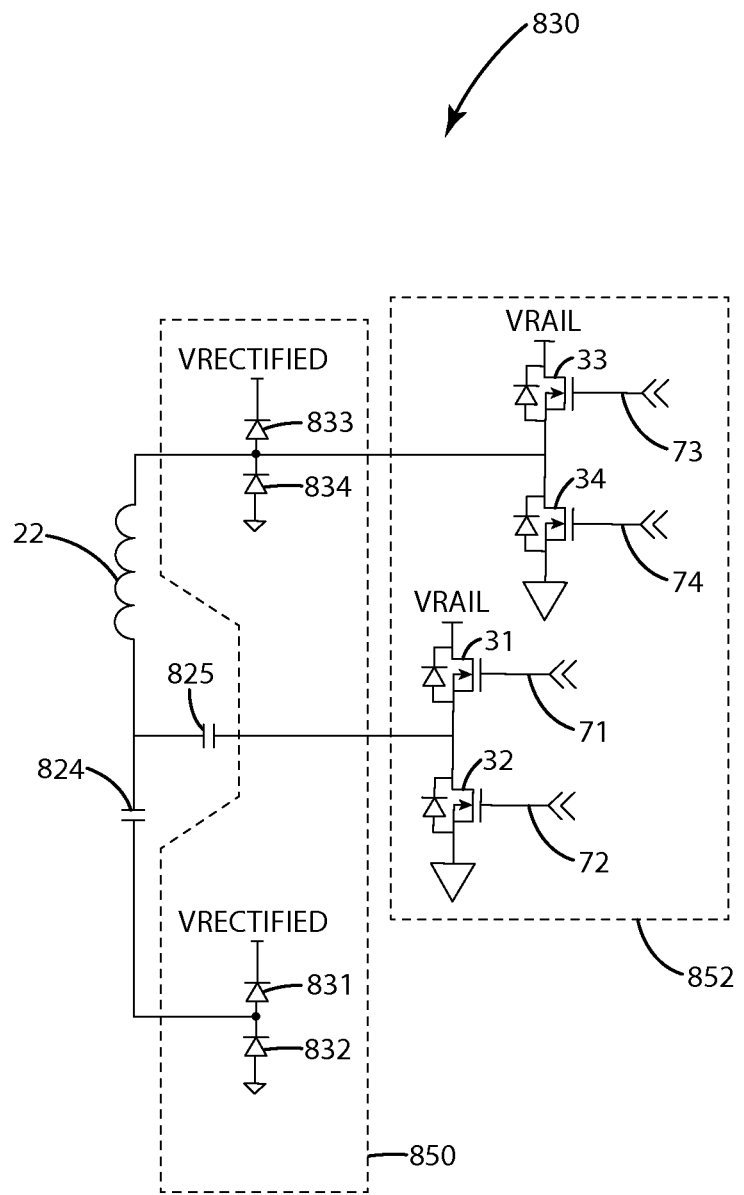
FIG. 32 is a schematic representation of a wireless power transceiver circuit of a remote device in accordance with an embodiment of the present invention.

In an alternative embodiment, shown, for example, in the illustrated embodiment of FIG. 32, the wireless power transceiver circuitry 830 may be similar to the wireless power transceiver circuitry 30, but with several exceptions. The wireless power transceiver circuitry 830 may include a separate diode rectifier 850 and inverter 852, each of which may be selectively coupled to the secondary 22, including, for instance, through separate resonant capacitors 824, 825. In one configuration, the separate diode rectifier 850 and inverter 852, and respective capacitors 824, 825, may be tuned to have the same resonant frequency. For example, the secondary 22 and capacitor 825 may have the same resonant frequency as the inverter 852 and capacitor 824.

In another configuration of this alternative embodiment, by using separate capacitors 824, 825, the resonant frequency of the transmit and receive modes may be tuned to different frequencies. For example, the secondary 22 and capacitor 825 may have a resonant frequency when driven by the inverter 852 in transmit mode that is different from the resonant frequency of the secondary 22 and capacitor 824 realized by the rectifier 850 in receive mode. This capability may enable the remote device when in transmit mode to achieve resonant power transfer at or near the receive mode resonant frequency, though tuning in the transmit mode may be different. For instance, proximity of other objects or devices or the device receiving power may affect the overall resonant frequency of the system so that tuning the transmit mode differently from the receive mode allows the remote device to achieve resonant power transfer at or near the receive mode resonant frequency.

The diode rectifier 850 in the illustrated embodiment is a full-wave bridge diode rectifier formed of four diodes 831-834, but the diode rectifier 850 may be any type of rectifier such as those mentioned herein, including, for example, a half-wave diode rectifier. The diode rectifier 850 also is not limited to diode rectification, and may, for example, be a synchronous rectifier in accordance with other rectification circuitry described herein.

Additionally, by using a separate diode rectifier 850 and inverter 852, the rectified voltage and the rail voltage for the inverter may be separated. For example, the rectified voltage output from the diode rectifier 850 can be used to supply one part of the remote device, while the rail voltage for the inverter 852 may come from a separate portion of the remote device. In one instance, the rectified voltage may provide 5V to a charging input of the remote device, while the rail voltage may be supplied by a 7.2V battery.

Switching from the receive mode to the transmit mode, the remote device 14 may initiate charging of another device or send an indication to the wireless power supply that it would like to receive wireless power. One advantage of using a synchronous rectifier over a diode rectifier is that the same switches 31-34 may be used as both a rectifier in the receive mode and as an inverter in the transmit mode. If an inductive power source is removed and the remote device 14 would like to transmit power instead of receive it, the controller 39 may control one or more of the switches 31-34 (either directly or through an oscillator or driver) to energize the transceiver 21 for wireless power transfer, thereby operating the wireless power transceiver circuitry 30 in transmit mode. In the transmit mode, the remote device 14 may use a control scheme similar to that used by the wireless power supply 12 described herein. Specifically, the transceiver 21 may be energized by controlling all four switches 31-34 as a full-bridge driver or by controlling a subset of the switches 31-34. As an example, the controller 39 may drive the gates 71-74 of just the upper or lower switches 31-34, using coupling capacitors to generate the appropriate gate charge on the other two switches 31-34 not driven directly by the controller 39.

Figure 29:
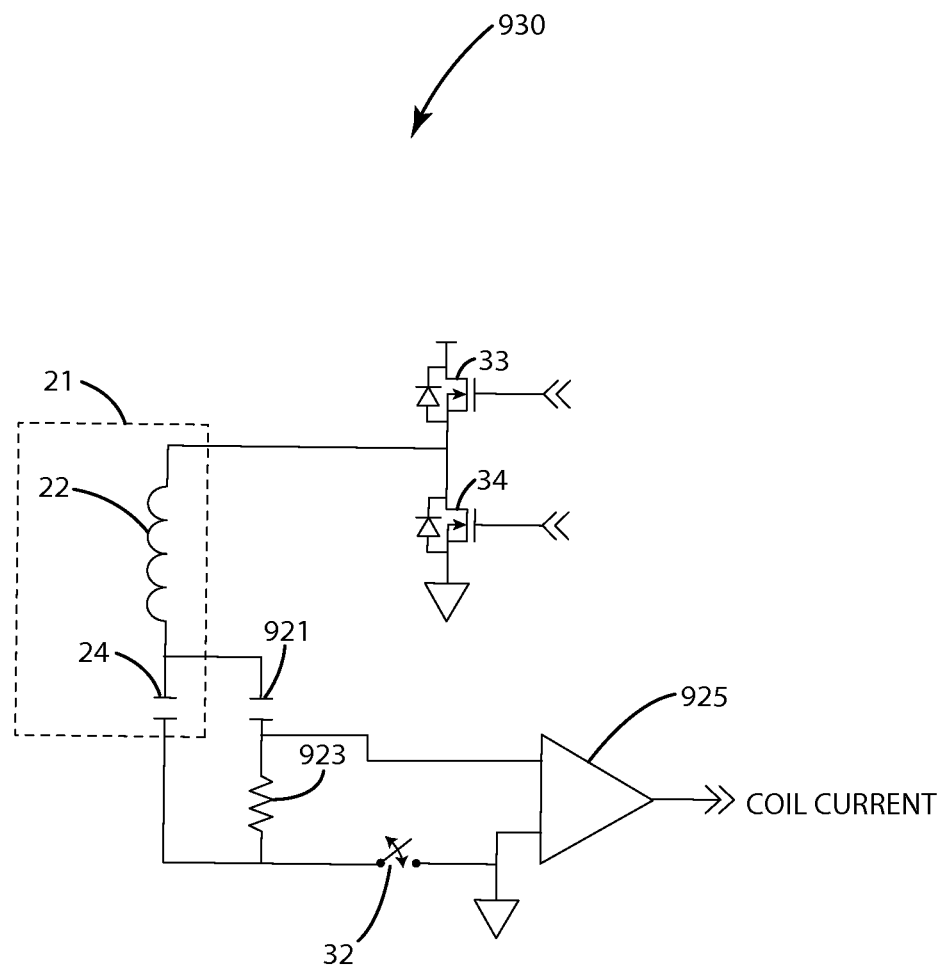
FIG. 29 is a schematic representation of a wireless power transceiver circuit of a remote device in accordance with an embodiment of the present invention.

As another example, the controller 39 may energize the transceiver 21 by driving one branch of the switches 31-34 in a half-bridge configuration including one high-side switch 31, 33 and one low side switch 32, 34. In this configuration, the high-side switch 31, 33 and the low-side switch 32, 34 are each on the same side of the transceiver. The other branch of the switches 31-34 not used in the half-bridge configuration may be configured so that one remains open and one remains closed, creating a low resistance path to either the positive or negative terminals. The illustrated embodiment of FIG. 29 shows wireless power transceiver circuitry 930 in such a configuration with one set of switches 33, 34 in a half-bridge drive configuration, while the other set of switches are configured as an open circuit to the positive terminal (Switch 31, in an open state, is not shown.) and a short circuit to the negative terminal (Switch 32 is shown as a switch operable between ON and OFF states).

In this alternative embodiment, the remote device 14 may further include sensor circuitry to enable the remote device 14 to measure a characteristic of power in the transceiver 21, thereby allowing the controller 39 to control transmission of wireless power in a manner similar to that implemented in the wireless power supply 12. For example, the sensor circuitry may sense at least one of voltage, current, phase, and power, and the controller 39 may vary a drive characteristic, such as operating frequency, duty cycle, phase, and rail voltage based on the sensed output. In the illustrated embodiment, the sensor circuitry is shown as an RC voltage divider 921, 923 in parallel with the series resonant capacitor 24 and an instrumentation amplifier 925 coupled to the RC voltage divider 921, 923. This construction enables the device to measure the current recirculating in the transceiver 21, but it should be understood that any type of sensor circuitry may be used to measure any characteristic of power in the transceiver 21.

Figure 7:
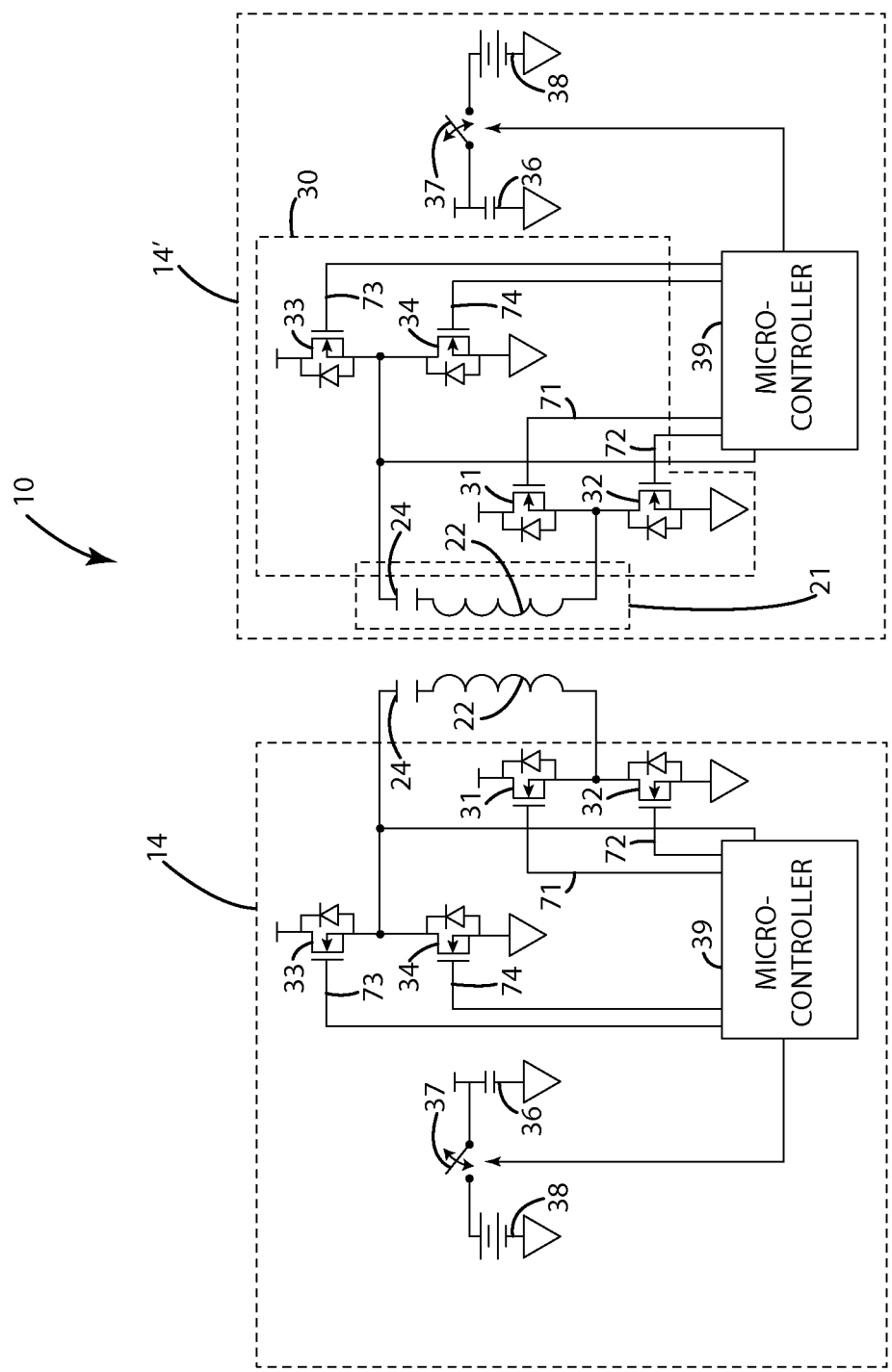
FIG. 7 is a schematic representation of a remote device transferring power to another remote device in accordance with an embodiment of the present invention.
Figure 8:
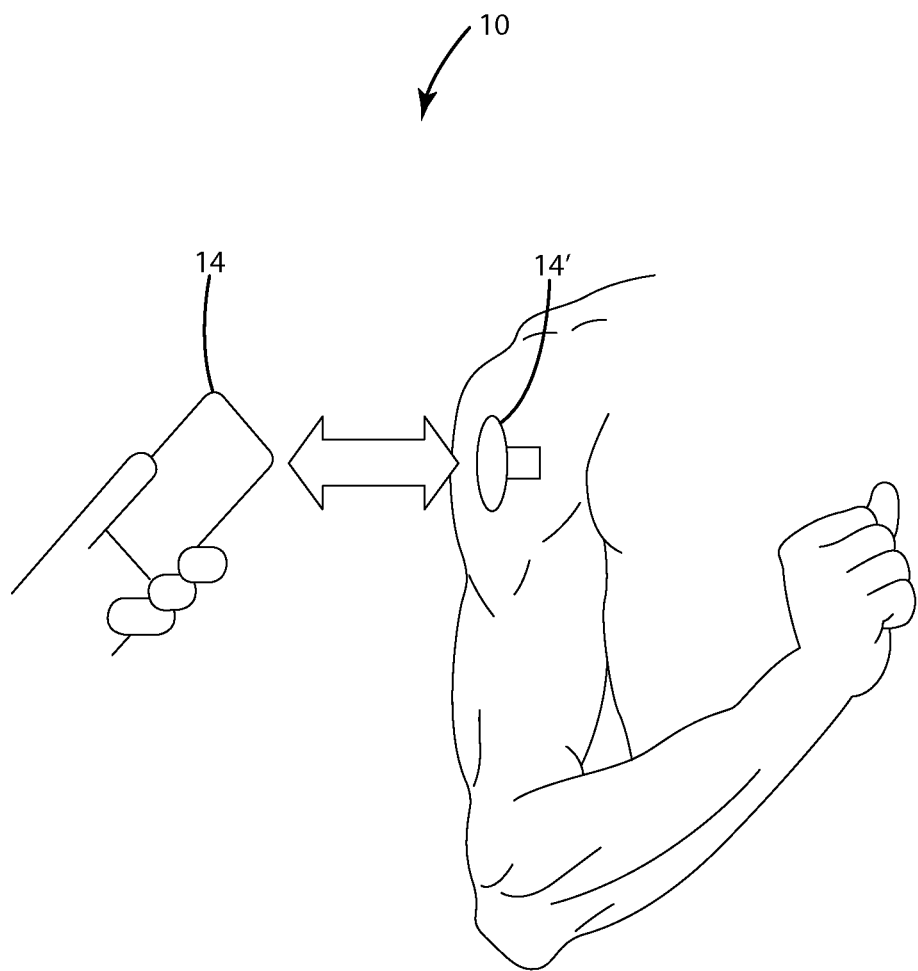
FIG. 8 is a representative view of a remote device to another device in accordance with an embodiment of the present invention.

Focusing now on the illustrated embodiments of FIGS. 7 and 8, the wireless power supply system 10 may be configured for transfer of power from one remote device 14 to another remote device 14' without being supplied power from a mains input, such as mains 50 in the wireless power supply 12. The remote device 14 may be similar to the remote device described with respect to FIGS. 1-6 herein, and the remote device 14' may also be similar to the remote device 14, as is shown in FIG. 7, but may be a remote device incapable of transmitting wireless power in alternative embodiments.

For example, as shown in the illustrated embodiment of FIG. 8, a remote device 14 capable of receiving inductive power may also be used to transmit inductive power to a remote device 14', such as a remote sensor or patch incapable of storing energy in a battery or supercapacitor. The remote sensor in one embodiment may be a printed sensor patch. Such a remote device 14' in this alternative embodiment may relay information back to the remote device 14 through either a separate communication channel (e.g., Bluetooth) or through a communication channel over the inductive coupling between the remote device 14 and the sensor 14'. Once the information is transmitted back to the remote device 14, the remote device 14 may store the information and then transmit that information using a similar or different communication link with the wireless power supply 12 when the remote device 14 is placed in proximity to the wireless power supply 12. Alternatively, the remote device 14 may transmit the information to other remote devices 14'. The remote device 14 in this alternative embodiment may be configured to gather additional data once the sensor 14' is detected. If, for example, the sensor is an internal temperature sensor or other environmental sensor (e.g., humidity or ambient light sensors), the remote device 14 may gather usage information or take a picture of the sensor 14' and its location. Additionally, the remote device 14 may determine the location or presence of the sensor 14' using an optical recognition scheme, such as a QR (Quick Response) code, shape identifier, or other visual cues.

Returning to the illustrated embodiment of FIG. 7, remote devices 14, 14' may charge one another using the same transceiver 21 to receive and transmit power. For example, the remote device 14 may transfer power to the remote device 14' wirelessly, thereby avoiding swapping batteries to charge one device from another.

In order to initiate transfer of wireless power from one remote device 14 to another remote device 14', the remote device 14 may sense a user action such as by sensing a bump via accelerometers (not shown), detect presence of the remote device 14' by measuring a change in current in the transceiver (indicative of a change in load or inductance), detect communications from the remote device 14' through modulation (e.g., backscatter modulation) of an impedance element coupled to the transceiver 21, or by detecting various known resonant frequencies of other remote devices 14'. Suitable identification and detection systems and methods are described in U.S. Pat. No. 7,989,986, which is entitled INDUCTIVE POWER SUPPLY WITH DEVICE IDENTIFICATION, and was issued Aug. 2, 2011, to Baarman et al.—which is incorporated herein by reference in its entirety. If a user action is used to initiate the transfer, the remote devices 14, 14' may then initiate communication therebetween to negotiate and set up the power transfer.

Figure 16:
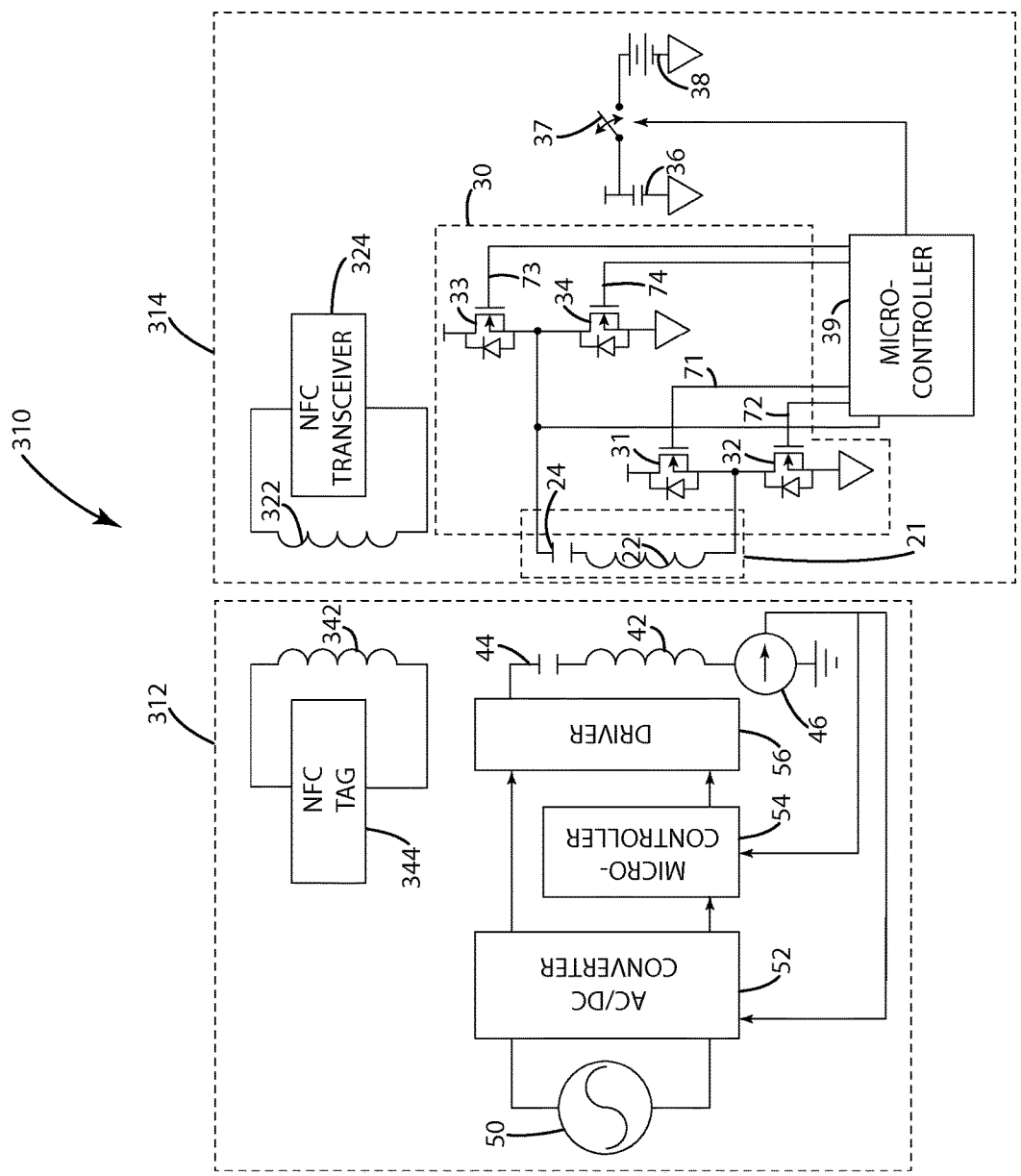
FIG. 16 is a schematic representation of a remote device and a wireless power supply in accordance with a fourth embodiment of the present invention.
Figure 17:
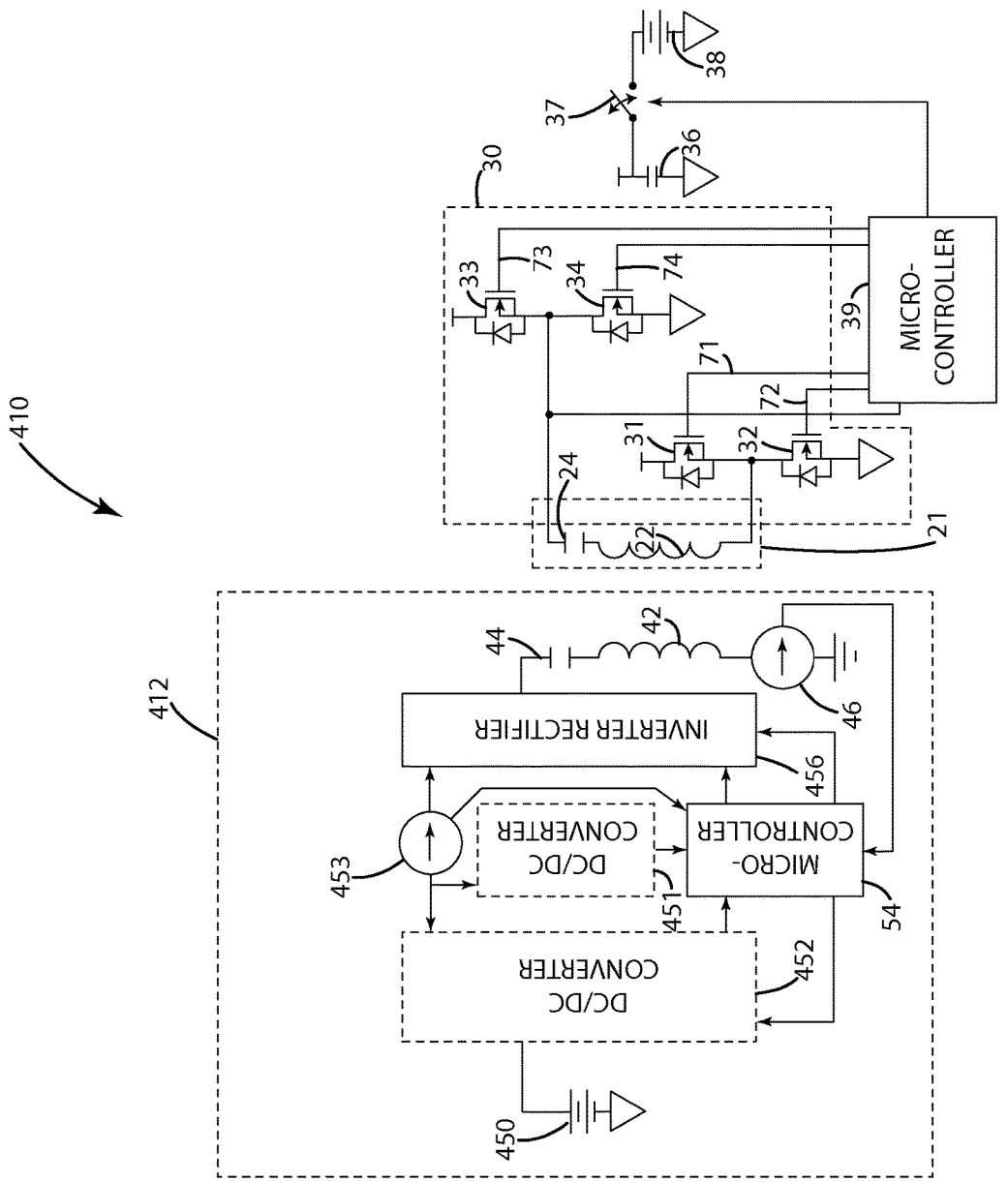
FIG. 17 is a schematic representation of a remote device and a wireless power supply in accordance with a fifth embodiment of the present invention.
Figure 18:
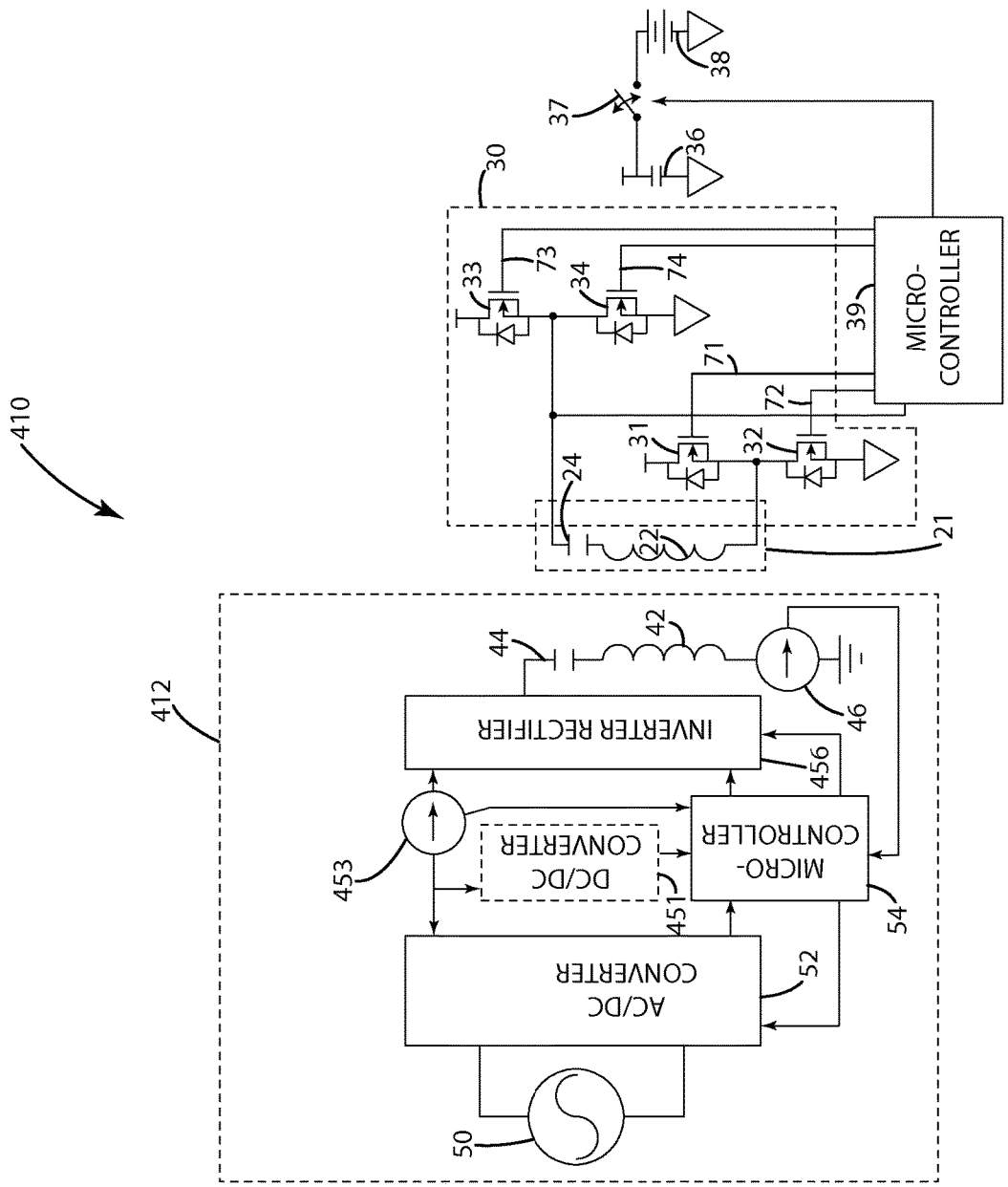
FIG. 18 is a schematic representation of the remote device and the wireless power supply in accordance with the fifth embodiment of the present invention.
Figure 19:
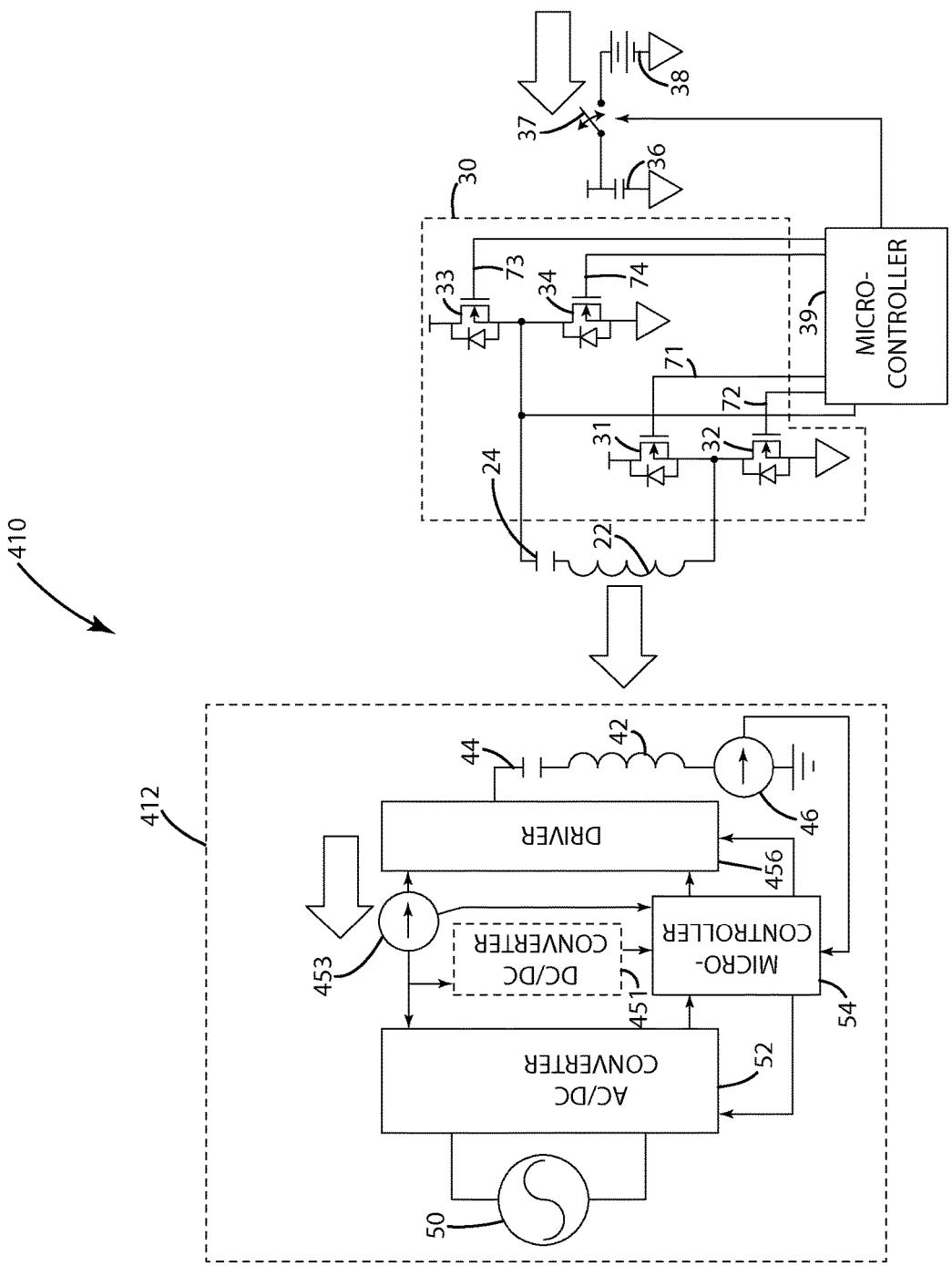
FIG. 19 is a schematic representation of the remote device and the wireless power supply, showing power transfer from the remote device to the wireless power supply, in accordance with the fifth embodiment of the present invention.
Figure 20:
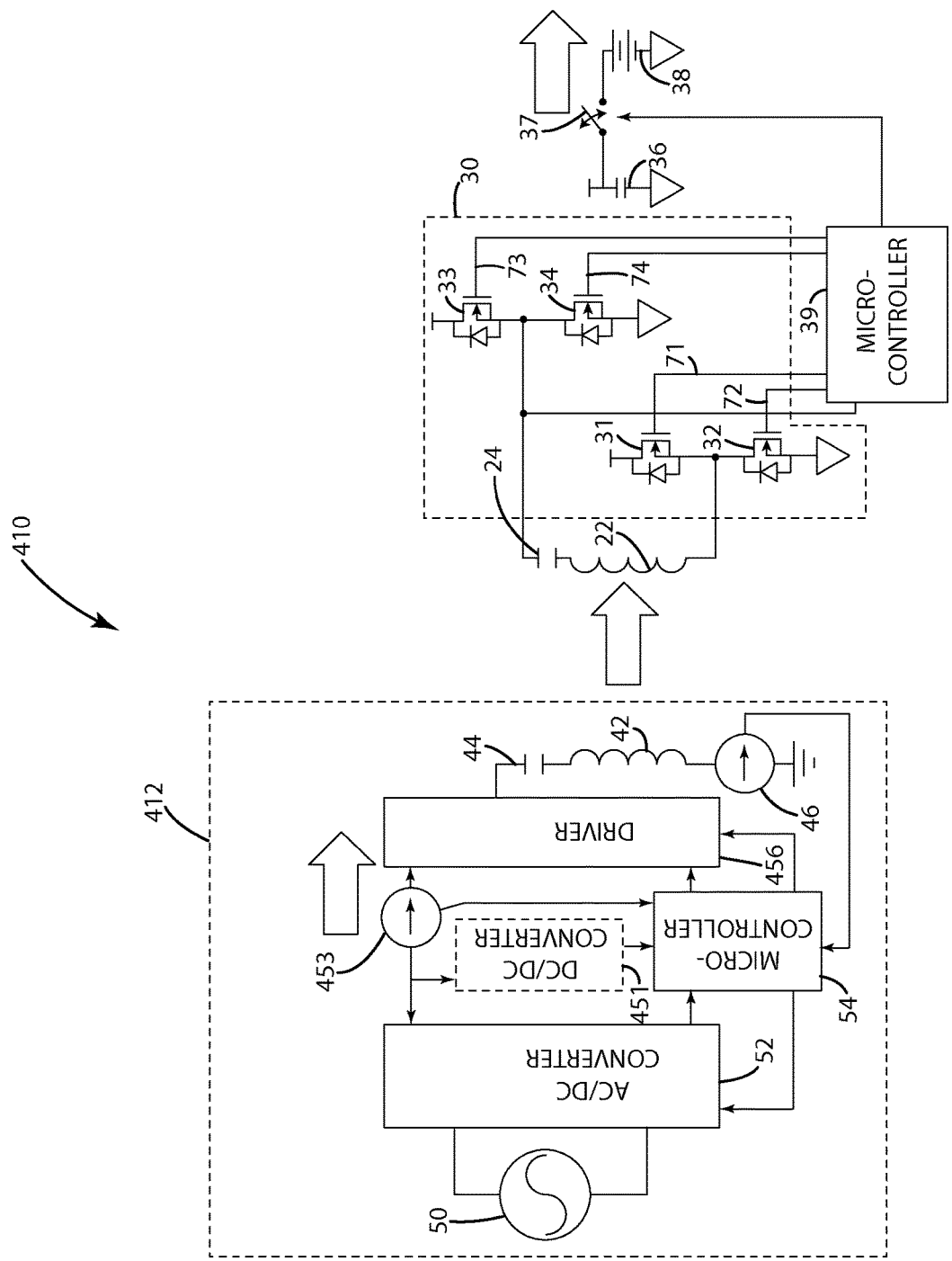
FIG. 20 is a schematic representation of the remote device and the wireless power supply, showing power transfer from the wireless power supply to the remote device, in accordance with the fifth embodiment of the present invention.
Figure 21:
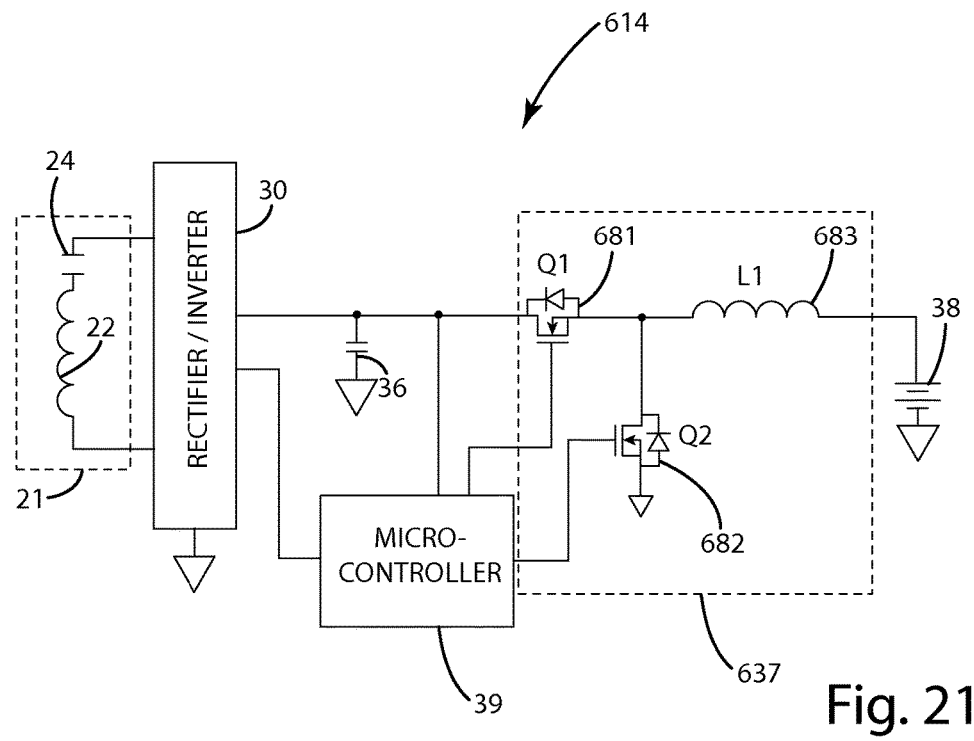
FIG. 21 is a schematic representation of the remote device in accordance with a sixth embodiment of the present invention.

To determine if a remote device 14' is in proximity to the remote device 14, the remote device 14 may periodically activate its transceiver 21, activate its transceiver 21 if prompted by a user action (such as a button or touch screen), or use a separate communication channel to detect a nearby remote device 14' or other device. For instance, an NFC (near field communication) or Bluetooth communication link may identify remote devices 14' in close proximity to the remote device 14. The illustrated embodiment of FIG. 16 shows such an NFC communication link with respect to a wireless power supply 312 and a remote device 314, but it should be understood that this NFC communication link may be implemented among remote devices 14, 14' as well. Once the separate communication link has assisted identification of nearby remote devices 14', the remote device 14 may then determine to activate its transceiver 21 for power transmission in transmit mode.

For purposes of disclosure the wireless power supply system 10 will now be described in connection with wireless power supply 12. It should be understood that the wireless power supply system 10 is not limited to a wireless power supply configured according to the wireless power supply 10 and that a conventional wireless power supply may be used in alternative embodiments. The wireless power supply 12 in the illustrated embodiment of FIGS. 1 and 3-6 may be configured to enter an ON state in response to receiving an input, such as receiving wireless power from a remote device (e.g., remote device 14). With this construction, the power supply 10 may conserve power by remaining in an OFF state, reducing power consumption, until a remote device 14 indicates that it would like to receive wireless power.

The wireless power supply 12 according to the illustrated embodiments of FIGS. 1 and 3-6 may include a primary 42, a resonant capacitor 42, a control system 54, a driver 56, a converter 52, and a mains input 50. The converter 52 of the current embodiment may be a conventional converter that transforms an AC input (e.g., wall power) from the mains input 50 into an appropriate DC output suitable for driving the wireless power transmitter primary 42. As an alternative, mains input 50 may be a DC source, which the converter 52 may pass through or transform into an appropriate DC output for driving the primary 42. In this embodiment, the converter 52 is an AC/DC converter generally having a rectifier and a DC/DC converter. The rectifier and DC/DC converter provide the appropriate DC output. The converter 52 may alternatively include essentially any circuitry capable of transforming input power to a form used by the driver 56. In this embodiment, the control system 54 is configured to adjust operating parameters other than rail voltage to energize the primary 42 for power transfer. Accordingly, the converter 52 may have a fixed output. The control system 54 may additionally or alternatively have the ability to adjust rail voltage and any other operating parameter, including for example operating frequency, resonant frequency, switching circuit phase and duty cycle. In an alternative embodiment where it is desirable to adjust operating parameters by varying the rail voltage, the converter 52 may have a variable output. As shown in FIG. 1, the control system 54 may be coupled to the converter 52 to allow the control system 54 to control the output of the converter 52.

In this embodiment, the driver 56 includes switching circuitry that is configured to generate and apply an input signal to the primary 42. The driver 56 may form an inverter that transforms the DC output from the converter 52 into an AC output to drive the primary 42. The driver 56 may vary from application to application. For example, the driver 56 may include a plurality of switches, such as MOSFETs or other switches described herein, arranged in a half-bridge topology or in a full-bridge topology, similar to the wireless power transceiver circuitry 30 described above in connection with FIGS. 1-7.

In this embodiment, the primary 42 is coupled to resonant capacitor 44 to form a tank circuit arranged in a series configuration. The present invention is not limited to use with series resonant tank circuits and may instead be used with other types of resonant tank circuits and even with non-resonant tank circuits, such as a simple inductor without matching capacitance. And, although the illustrated embodiment includes coils, the wireless power supply 10 may include alternative inductors or transmitters capable of generating a suitable electromagnetic field. Alternative embodiments may further include a resonator circuit having a resonator coil (or inductor) and a resonator capacitor, enabling the primary 42 to transmit power in conjunction with the resonator circuit.

The wireless power supply 12 may also include a coupler 46 capable of sensing a characteristic of power in the primary 42. For example, the coupler 46 may be a current sensor that provides information to the control system 54, which may adjust operating parameters based on the sensed information. Other characteristics of power capable of being sensed include, but are not limited to, real power, apparent power, phase, and voltage. In one embodiment, the coupler 46 may also transfer a portion of power in the primary 42 to the converter 52, enabling activation of the converter 52 in order to wake the power supply from an OFF state.

The control system 54 includes portions configured, among other things, to operate the driver 56 to produce the desired power supply signal to the primary 42. For example, the control system 54 may control the driver 56 or adjust operating parameters based on communications received from the remote device 12. Alternatively or in addition to control based on communications, the control system 54 may adjust operating parameters based on a characteristic of power sensed in the coupler 46. The present invention may be implemented using essentially any systems and methods capable of transferring wireless power. Suitable wireless power transfer systems and various alternatives are described in U.S. Pat. No. 7,212,414, which is entitled ADAPTIVE INDUCTIVE POWER SUPPLY, and was issued May 1, 2007, to Baarman; and in U.S. Pat. No. 7,522,878, which is entitled ADAPTIVE INDUCTIVE POWER SUPPLY WITH COMMUNICATION, and was issued Apr. 21, 2009, to Baarman—all of which are incorporated herein by reference in their entirety.

The wireless power supply 12 may be configured to enter an OFF state in which no power, or little power, is drawn from the mains input 50 or another energy source, such as a battery, a capacitor, or an energy storage element. The converter 52 having power saving circuitry may selectively turn ON and OFF to either draw power or prevent power draw from the mains input 50. The power saving circuitry may be separate from the converter 52 in some embodiments.

Figure 4:
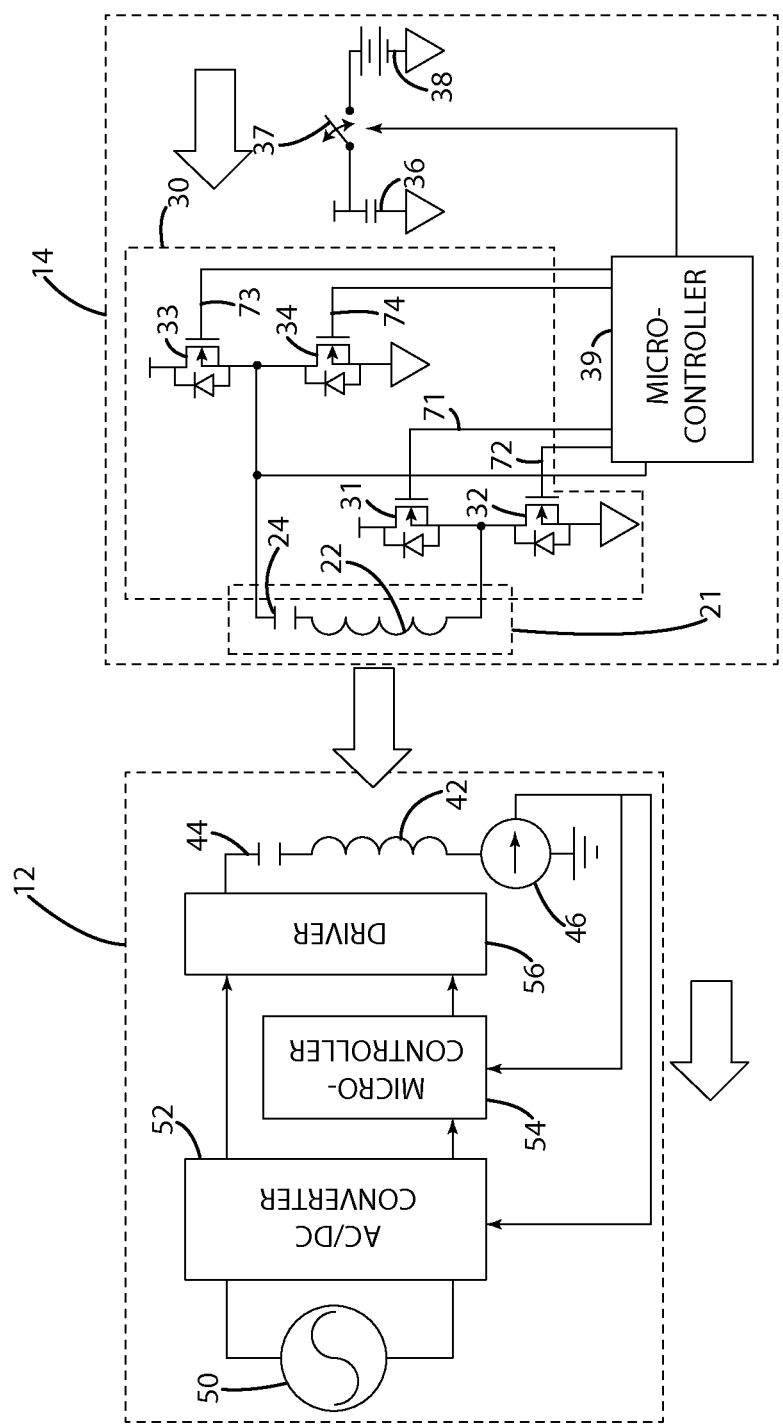
FIG. 4 is a schematic representation of the wireless power supply and the remote device, showing flow of power from the remote device to the wireless power supply, in accordance with an embodiment of the present invention.
Figure 5:
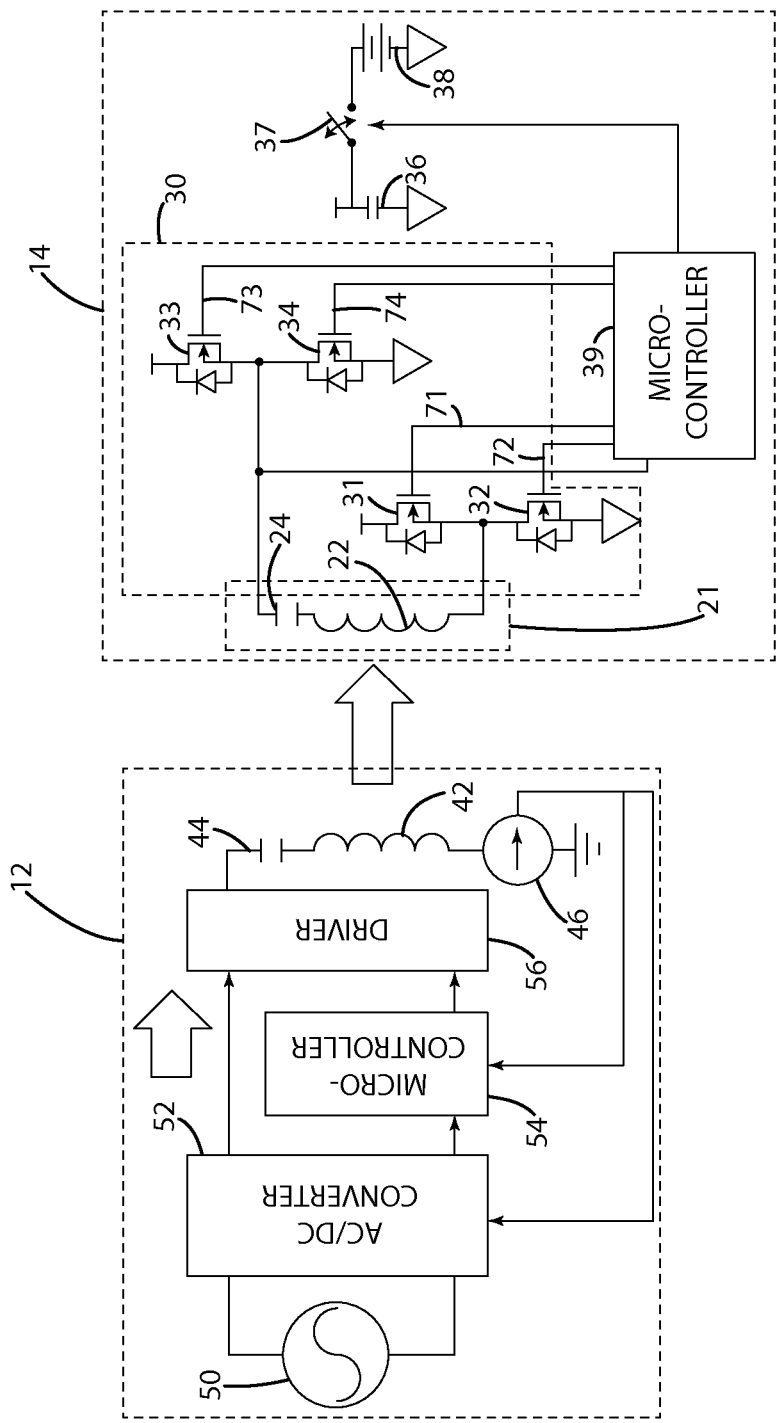
FIG. 5 is a schematic representation of the wireless power supply and the remote device, showing flow of power from the wireless power supply to the remote device, in accordance with an embodiment of the present invention.
Figure 6:
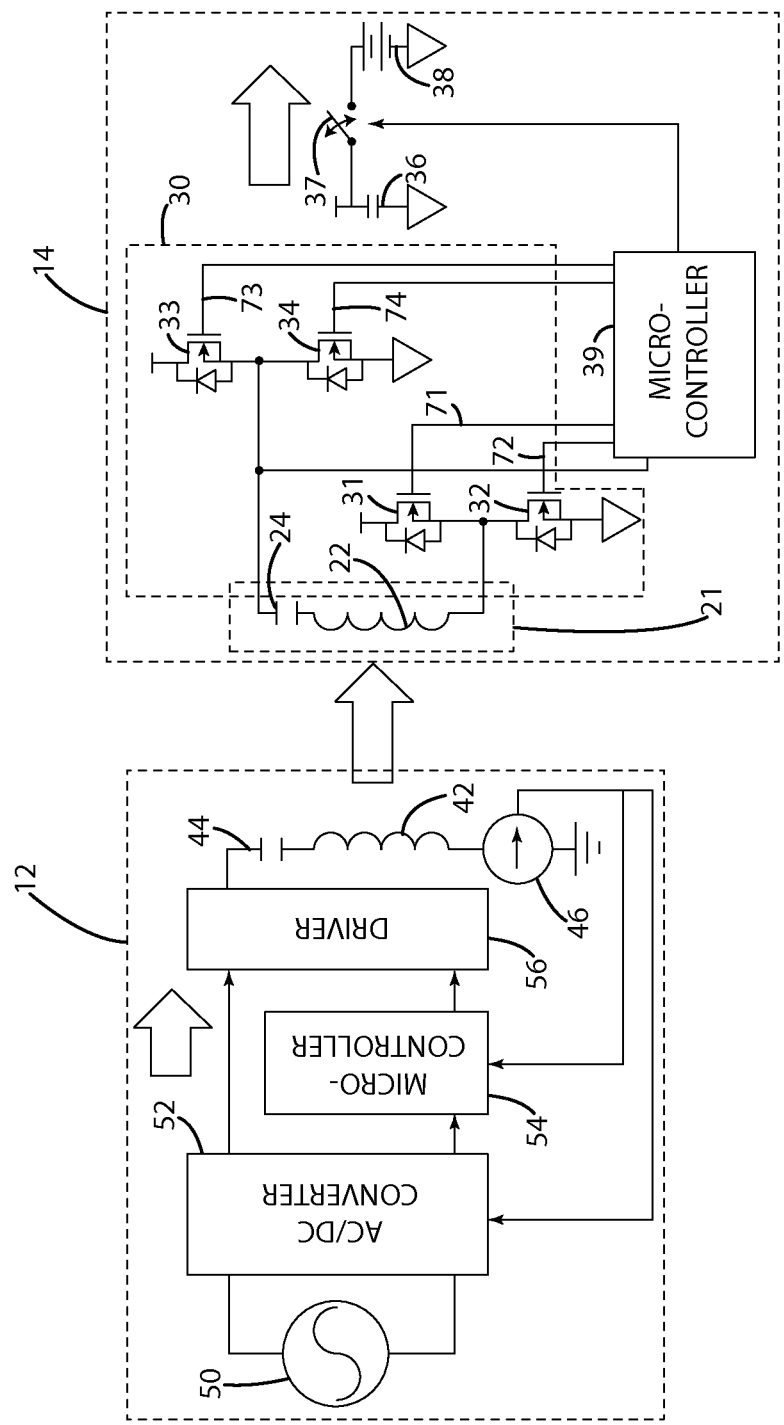
FIG. 6 is a schematic representation of the wireless power supply and the remote device, showing flow of power from the wireless power supply to the remote device, in accordance with an embodiment of the present invention.

The coupler 46 may provide an input to the converter 52 that selectively activates the converter 52 in response to power being present in the primary 42. For example, if the wireless power supply 12 is in an OFF state and the remote device 14 transmits wireless power to the primary 42 (e.g., to indicate that it would like to receive wireless power), this power generated in the primary 42 may be used to activate the converter 52 in order to wake the wireless power supply 12 and to initiate power transfer to the remote device 14. For example, the illustrated embodiment of FIG. 4 shows the switch 37 of the remote device 14 being switched to draw power from the battery 38 and to supply power to the wireless power supply 12. The power received in the wireless power supply 14 may in turn result in the converter 52 switching from an OFF state to an ON state.

By using power saving circuitry in the converter 52, the converter 52 may be able to turn OFF supply from an AC or DC power source, such as wall power, a battery, or a capacitor. The converter 52 may be an AC/DC converter or DC/DC converter, and the wireless power supply may be able control the power saving circuitry to completely shut down the converter 52 and use energy provided by a remote device 14 to turn ON. Once the remote device 14 has provided power, the wireless power supply 12 may turn ON the converter 52, allowing the wireless power supply 12 to provide power back to the remote device, as shown in the illustrated embodiment of FIG. 5. Once power received in the remote device 14 reaches an appropriate level, the controller 39 of the remote device 14 may control the switch 37 to charge the battery 38, as shown in the illustrated embodiment of FIG. 6

With this configuration, the wireless power supply 12 may shut down completely by turning OFF the converter 52. Shutting down the converter 52 may power down the control system 54, preventing it from being able to turn ON the wireless power supply 12 without being provided a power source or external input. Once shut down, the wireless power supply 12 may be turned back ON using inductive energy transmitted from the remote device 14. This energy couples to the primary 42 within wireless power supply 12, or alternatively, a separate coil or receiver within the wireless power supply 12. The energy can either supply power to the rail of the driver 56 through a passive or active rectifier, or the energy can turn ON the converter 52. Once powered ON, the wireless power supply 12 may turn itself OFF if it detects no remote devices 14 in proximity or no remote devices 14 that desire wireless power. A holding period between such a detection event and the actual shutoff may be implemented to ensure that the wireless power supply 12 does not unnecessarily shut itself OFF.

C. Methods of Operation

The methods of the present invention are described primarily in the context of embodiments in which wireless power transceiver circuitry 30 may be configured to receive and transmit wireless power. Generally speaking, a remote device 14 may be capable of detecting if another remote device 14 is transmitting wireless power. Alternatively or in addition to this detection capability, the remote device 14 negotiates a power transfer from or to another remote device 14.

Figure 30:
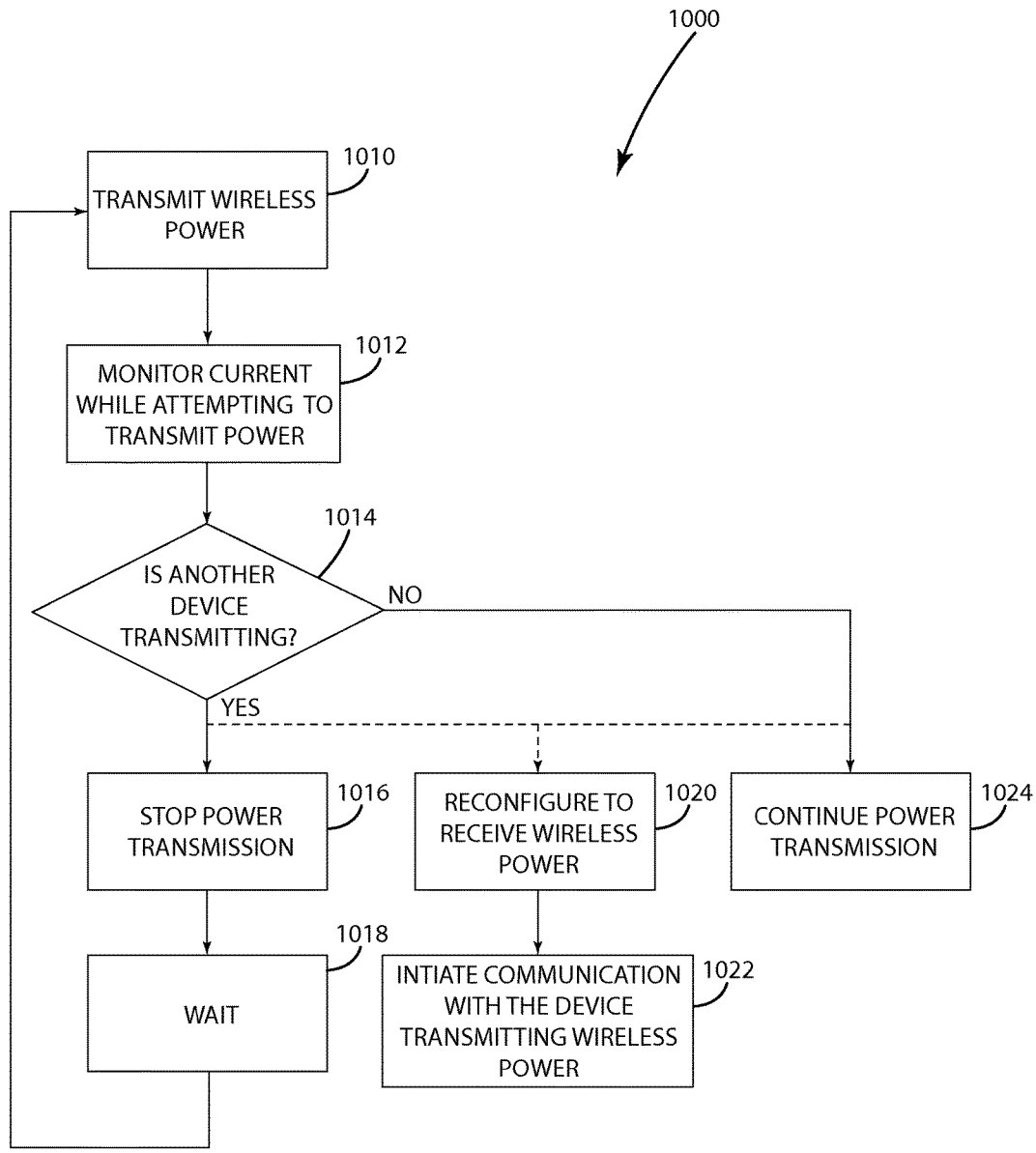
FIG. 30 is a flowchart showing the general steps of a method in accordance with an embodiment of the present invention.

An embodiment directed to detecting if wireless power is being received from another remote device 14 will now be described with reference to the process 1000 of FIG. 30. The process primarily includes the steps of attempting to transmit wireless power, and monitoring the direct current flowing into or out of the wireless power transceiver circuitry 30 to determine if another remote device 14 is trying to transmit power. Steps 1010, 1012. If the current flowing into the wireless power transceiver circuitry 30 is taken as a positive current, but the remote device 14 measures a negative current while trying to transmit power, then another remote device 14, or a wireless power supply 12, is also transmitting power. Step 1014. Put differently, the remote device 14 may determine that another device is transmitting power if the current in the wireless power transceiver circuitry 30 surpasses a threshold. In an alternative embodiment, characteristics of power other than current in the wireless power transceiver circuitry 30 may be monitored to determine if another device is transmitting power. For example, in response to the remote device 14 attempting to transmit wireless power, detecting a deviation from a predicted effect on a characteristic of power may be indicative that another device is transmitting power.

In one embodiment, if the remote device 14 determines that no devices are transmitting wireless power, then it may continue to transmit power. Step 1024. However, if the remote device 14 determines another device is transmitting power, the remote device 14 may stop transmitting power and enter a wait state. Steps 1016 and 1018. In the wait state, the remote device 14 may remain idle until it receives an input to perform an action. It may also wait for a duration of time before re-trying to transmit power. Step 1010. In an alternative embodiment, the remote device 14 may keep trying to transmit power as shown by the broken line to Step 1024, or the remote device 14 may reconfigure to receive mode in order to rectify the power being transmitted by the other device as shown by the broken line to Step 1020. If the device switches to receive mode, it may then attempt to communication to the device transmitting wireless power using load modulation. Step 1020.

There may be some circumstances in which two remote devices 14, or one remote device 14 and a wireless power supply 12, attempt to transmit wireless power at the same frequency, potentially resulting in an unexpected value of reflected impedance seen by either device. For example, if a first remote device 14 is transmitting power at the same frequency but at a slightly leading phase angle relative to power being transmitted by a second remote device 14, the current in the first remote device 14 may be much more than the current that would otherwise result under different conditions. Likewise, the second remote device 14 may detect a negative current into the wireless power transceiver circuitry 30, even if the rail voltage in the second remote device 14 is higher than the rail voltage in the first remote device 14. In other words, the second remote device 14 may detect power being transmitted by another device despite that power being transmitted at a higher or lower power level. The second remote device 14 may determine another device is transmitting power in response to detecting current above or below a threshold value.

To avoid damage to either remote device 14, one or both of the first and second remote devices 14 may adjust one or more operating parameters, such as changing operating frequency or duty cycle, inserting a temporary phase delay, or shutting down. When adjusting operating parameters, the remote device 14 may adjust by a predetermined step or a random step. For example, if two remote devices 14 begin transmitting power at the same frequency and one or both detect current into the rail varying from a threshold value, one or both remote devices 14 may insert a phase delay into their inverters and measure the change in current. If the direction of the current reverses, this may be indicative of another device attempting to transmit power at the same frequency.

An embodiment for negotiating power transfer between a remote device 14 and another device, such as another remote device 14, will now be described with reference to the process 1100 of FIG. 31. Two remote devices 14 may communicate the current charge state of their respective batteries 38 and their energy needs, and negotiate a power transfer so that the remote device 14 with more available energy transmits power to the other remote device 14 with less available energy. For purposes of disclosure, the method of negotiating power transfer is described in connection with two remote devices 14 capable of both transmitting and receiving power; however, it should be understood that the present invention is not limited to such a configuration, and that a remote device 14 may be capable of negotiating power transfer with another device incapable of transmitting power wirelessly.

Two remote devices 14 according to the present invention may include a communication system that enables the remote devices 14 to communicate with each other. The communication system may be similar to the communication system described with respect to the remote device 14 of FIGS. 1-8. For example, the remote devices 14 may communicate with one another through a communication channel separate from the transceiver 21, or by initiating power transfer and communicating via inductive coupling between the transceivers 21.

If the remote devices 14 communicate with one another via the inductive coupling, then each remote device 14 may be able to modulate data over received power in the receive mode using a load modulator and to modulate data over transmitted power in the transmit mode. The remote devices 14 may use any type of modulation technique, including frequency modulation, amplitude modulation or phase modulation, with any type of scheme, including for example bi-phase encoding, code mark inversion (CMI) encoding, and miller encoding. And, the transmitting remote device 14 may use the same or different modulation than the receiving remote device 14. In one embodiment, when receiving inductive power in the receive mode, the remote device 14 may detect communication via the transceiver 21 using a frequency, amplitude, or other detection circuit to receive communications from the device currently transmitting power. The remote device 14 may then communicate back by switching an impedance element in an out, thereby modulating data.

Communication between a first remote device 14 and a second remote device 14 may be half-duplex mode or full-duplex mode. In half duplex mode, if the first remote device 14 detects communication from the second remote device 14, the first remote device 14 may wait to communicate back until the second remote device 14 has completed its data communications. In full-duplex mode, the first remote device 14 may communicate back to the second remote device 14 while receiving communications from the same second remote device 14. In full-duplex mode, the modulation techniques may be different to prevent data corruption. For example, if a second remote device 14 is transmitting power to a first remote device 14, and the second remote device 14 is using a frequency modulating technique (e.g., the operating frequency is being modulated to provide communications), the first remote device 14 may use an amplitude or phase modulation technique. However, if a second remote device 14 is transmitting power and using an amplitude modulation technique, the first remote device 14 may use an alternate means of modulation, such as phase shift keying (PSK), to prevent the amplitude of current in the transceiver 21 from being altered, thereby potentially corrupting the transmitted communication from the second remote device 14.

Figure 31:
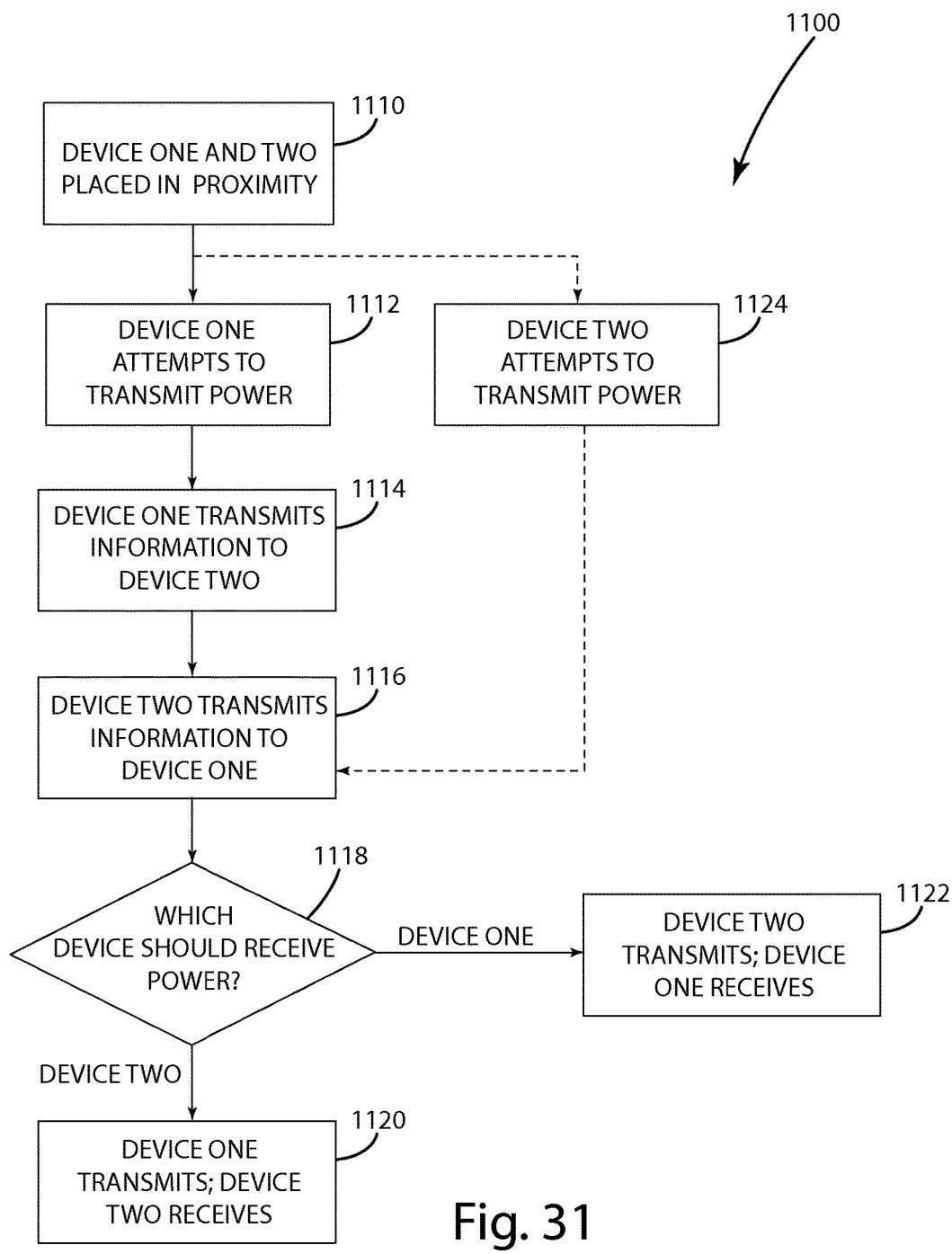
FIG. 31 is a flowchart showing the general steps of a method in accordance with an embodiment of the present invention.

Referring now to FIG. 31, the first and second devices 14 may negotiate power transfer according to method 1100 in one embodiment of the present invention. Once the remote devices 14 have been placed in proximity and detected such proximity, one or both of the devices 14 may begin to drive their transceiver using the wireless power transceiver circuitry 30 in a transmit mode. Steps 1110, 1112, and 1122. Alternatively, the first remote device 14 may begin power transfer while the second remote device 14 remains idle, thereby omitting step 1122 shown in dashed lines. In one embodiment, a random delay from the time of detecting proximity may be used in one or both devices 14 to try to avoid transmitting power at the same time.

The remote device or devices 14 that are driving their transceiver 21 may communicate information about themselves, including, for example, device type, battery charge level as a percentage, total battery power available, current power usage by the device, and other information about the remote device 14, its load, or its battery state. Step 1114.

Once the information about each remote device 14 has been communicated to the other remote device 14, a decision is made about which remote device 14 should actually be transmitting power, and which should be receiving. Step 1116. This decision may be based on one or more of the following: which remote device 14 has a more depleted battery 38, which remote device 14 is using more power, which remote device 14 has a larger battery 38. For example, if the first remote device 14 has a 1500 mAHr battery that is 50% depleted, but the battery 38 of the second remote device 14 is a 500 mAHr battery that is 60% depleted, the first remote device 14 with the larger battery 38 still has more total energy available, and may transmit power instead of receive. Step 1118. However, if the first remote device 14 has a battery 38 capable of discharging at a rate of 1 A and the first remote device 14 is currently using 750 mA to power other parts of the first remote device 14 (such as a screen, microprocessor, or radio link), the first remote device 14 may not be able to provide much power because the battery 38 cannot supply that much current. In this instance, the first remote device 14 may decide to receive power instead of transmit power (Step 1120), or the first remote device 14 may decide to transmit power but limit the second remote device 14 to a smaller amount of transferred power. Alternatively, if the first remote device 14 is transmitting a limited amount of power to the second remote device 14 or if it would like to limit the amount of power transferred, the first remote device 14 may communicate the maximum amount of power available to the second remote device 14 so that the second remote device 12 limits the amount of power it receives either by reducing the output voltage of the wireless power transceiver circuitry 30, reducing the output of a power regulator (e.g., a DC/DC converter), or reducing the charge current, or a combination thereof.

In an alternative embodiment in which the remote devices 14 are capable of one-way communication, the first and second remote device 14 may use load modulation in a one-way communication mode. In this configuration, the first remote device 14 may provide information about itself while receiving power. Once the first remote device 14 has completed sending this information, it sends a request to the second remote device 14 to stop transmitting power. The first and second remote devices 14 then reverse the flow of power, and the second remote device 14 may then be able to communicate its information. Once both remote devices 14 have been able to transfer information, a decision may be made as to which remote device 14 will become the power transmitter and which will become the receiver.

In this alternative embodiment, if both the first and second remote devices 14 attempt to transfer power at the same time, then communication may be prevented or degraded, particularly if both remote devices 14 are attempting to use the same modulation technique. In this instance, each remote device 14 may measure the direct current flowing into their own wireless power transceiver circuitry 30. If each current level is above or below a threshold level when first applying power, the remote device 14 may recognize that another remote device 14 is attempting to transfer power. One of the remote devices 14 may then convert to a receive mode and begin modulation to try and communicate to the other remote device 14. Alternatively, the remote device may simply turn off and wait for a predetermined or random amount of time to try and transfer power again.

When a remote device 14 determines to transmit power to see if other remote devices 14 are proximate, a remote device 14 may vary the amount of power applied to the transceiver 21 based on the available power in the remote device 14. For example, if the remote device 14 is fully charged and is not using much power, it may apply a large amount of power to its transceiver 21 by operating closer to its resonance point, increasing the duty cycle of the switches 31-34, or increasing the rail supply to the inverter of the wireless transceiver circuitry 30. Conversely, if the battery 38 is depleted, the remote device 14 may apply a small amount of power to its transceiver 21 at a frequency farther away from its resonance point, decrease the duty cycle of the switches 31-32 to apply a small amount of power to the transceiver 21, or decrease the rail supply to the inverter of the wireless transceiver circuitry 30 in order to apply a small amount of power to the transceiver 21. In doing so, when two remote devices 14 begin transmitting power at the same time, the remote device 14 transmitting less power may begin to receive power even though it is attempting to drive its transceiver 21. This effect may be detected in the remote device 14, which in response may then revert into receive mode very quickly. Once the remote device 14 is in receive mode, it may begin communicating to the other remote device 14. With this method, remote devices 14 that have more available power may be configured as the power transmitter if a power collision occurs.

However, if two remote devices 14 are transmitting power at the same frequency, the variance in reflected impedance discussed herein may skew a remote device's 14 ability to detect which remote device 14 has more available power. If a remote device 14 detects another remote device 14 attempting to transmit power at the same frequency, the remote device 14 may simply shut down and try again, or it may change its operating frequency to try and operate at a different frequency than the other remote device 14.

D. Second Embodiment

Figure 9:
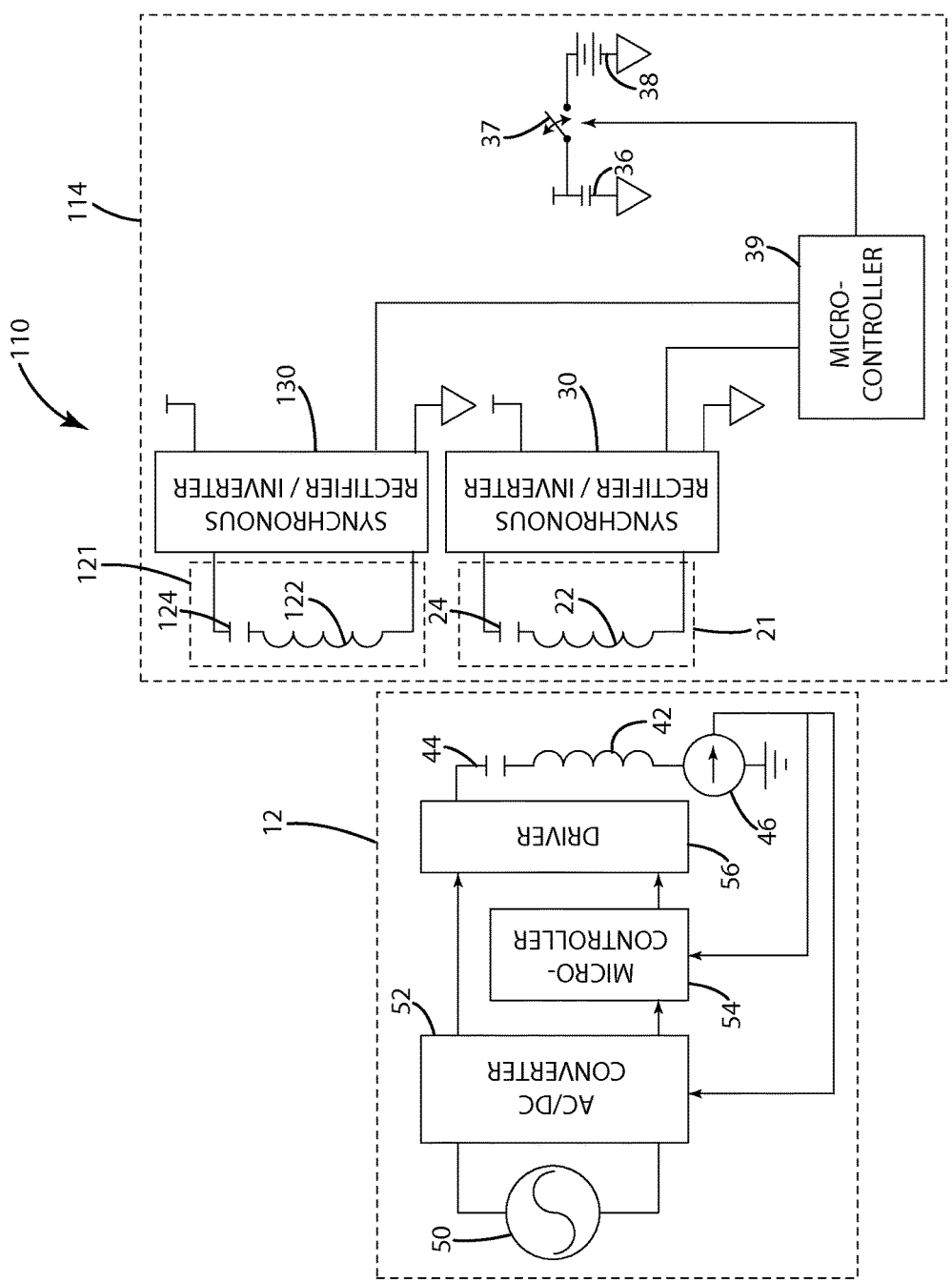
FIG. 9 is a schematic representation of a wireless power supply and a remote device in accordance with a second embodiment of the present invention.

In a second embodiment of the present invention, the wireless power supply system 110 is similar to those described herein with respect to wireless power supply system 10, including wireless power supply 12 and remote device 14, with several exceptions. The second embodiment may include a remote device 114 similar to the remote device 14 of the illustrated embodiments of FIGS. 1-8 but with multiple secondaries. In one embodiment, multiple secondaries in remote device 114, 114' may be selectively activated to transmit or receive wireless power. It should be understood that remote devices 114, 114' are not limited to operation with each other, and that the remote device 114 may be used in conjunction with other devices or wireless power supplies described herein, including wireless power supply 12 as shown in the illustrated embodiment of FIG. 9.

In the illustrated embodiments of FIGS. 9-13, the remote devices 114, 114' are similar to the remote device 14, 14' but may include second wireless power transceiver circuitry 130 and a second transceiver 121 having a second secondary 122 and a second resonant capacitor 124. These components may be configured similarly to the secondary 22, resonant capacitor 24, and wireless power transceiver 30 described with respect to the illustrated embodiment of FIGS. 1-8. The second secondary 122 and secondary 22 in the illustrated embodiment are concentric, but they may be configured in any way with respect to each other. Further, one or more of the transceivers 21, 121 may not include wireless power transceiver circuitry 30, 130 in an alternative embodiment, and may or may not be connected to separate DC/DC converters.

With more than one transceiver 21, 121, 21', 121', the remote device 114, 114' may selectively activate one or more transceivers 21, 121, 21', 121' to transmit or receive power. In an alternative embodiment, the second wireless power transceiver circuitry 130, or the wireless power transceiver circuitry 30, may be a simple conductor forming, for example, a low resistance loop with the second secondary 122 and second resonant capacitor 124. This configuration of the transceiver 121 may be described as a resonator circuit, which may assist coupling between the transceiver 21 and a transmitter, such as primary 42.

The transceiver 21, the second transceiver 121, or both may be selectively activated to transfer power from or receive power in the remote device 114 in a manner similar to the transceiver 21 described herein. For instance, one or both of the wireless power transceiver 30 and second wireless power transceiver 130 may be configured in a transmit mode to transfer power from the remote device 114. Likewise, one or both may be configured in a receive mode to receive power in the remote device 114. As another example, in circumstances where the remote device 114 is transferring power to the remote device 114', or the other way around, the second transceiver 121 of the remote device 114 may be used for power transmission while the transceiver 21' of the remote device 14' may be used for power reception. Or the transceiver 21 of the remote device 114 may be used for power transmission while the second transceiver 121' of the remote device 14' may be used for power reception.

Figure 10:
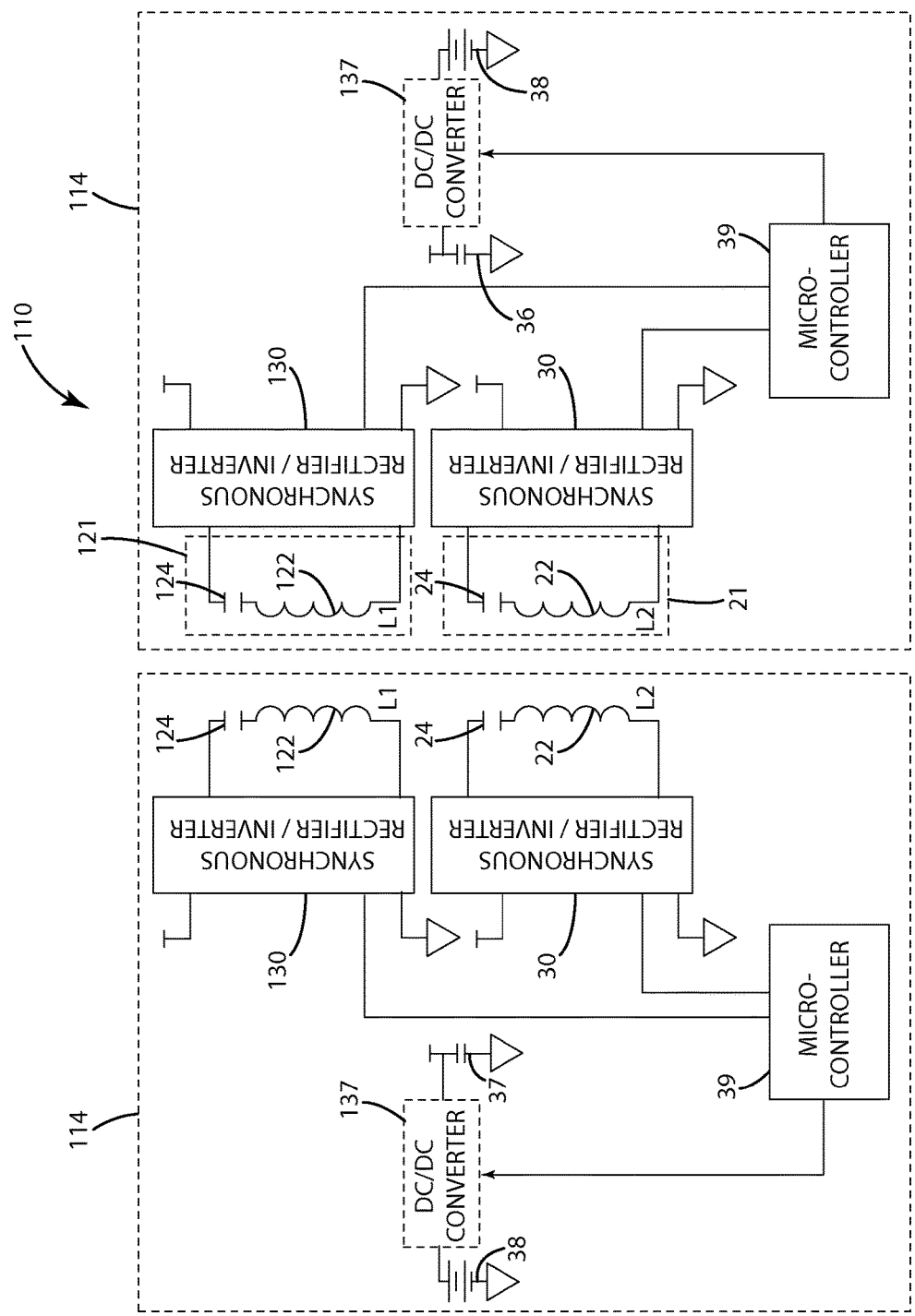
FIG. 10 is a schematic representation of the remote device and another remote device in accordance with the second embodiment of the present invention.
Figure 11:
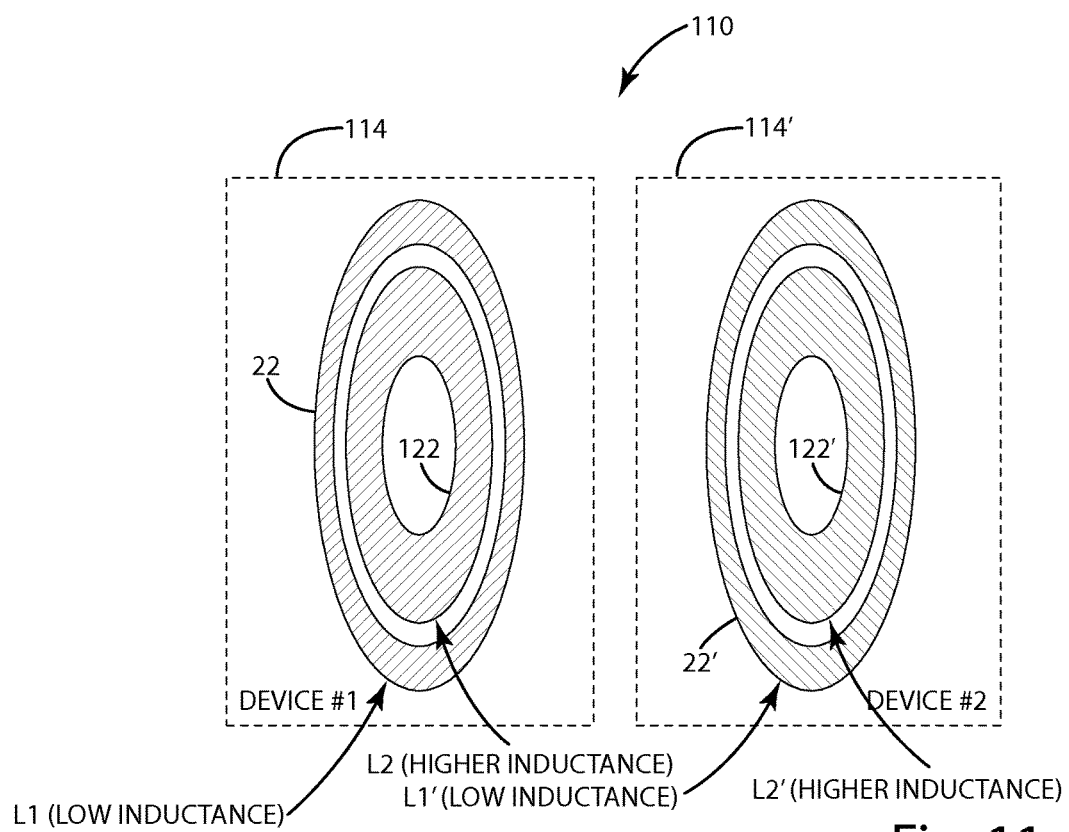
FIG. 11 is a representative view of the remote device and the other remote device in accordance with the second embodiment of the present invention.
Figure 12:
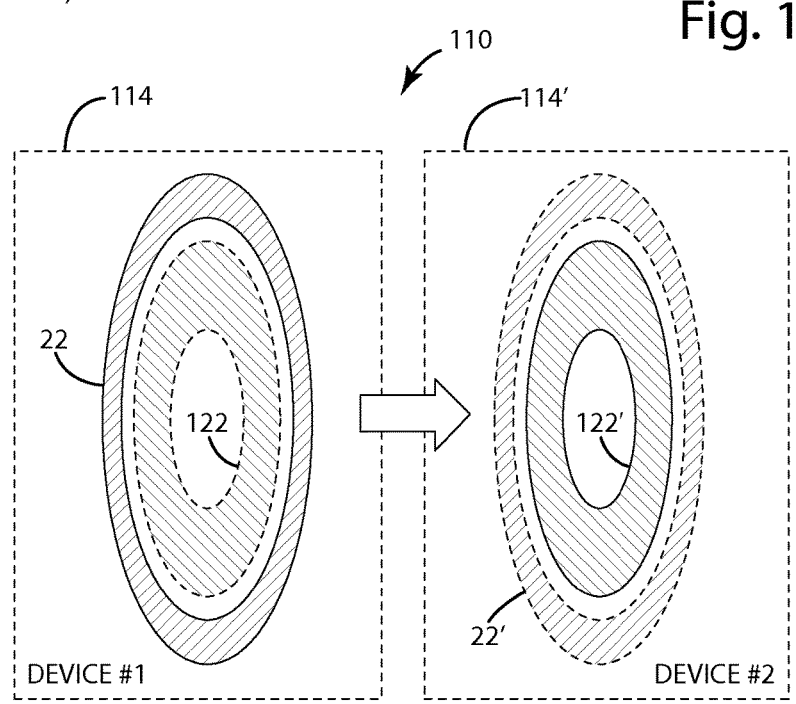
FIG. 12 is a representative view of the remote device and the other remote device, showing power transfer from one to the other, in accordance with the second embodiment of the present invention.
Figure 13:
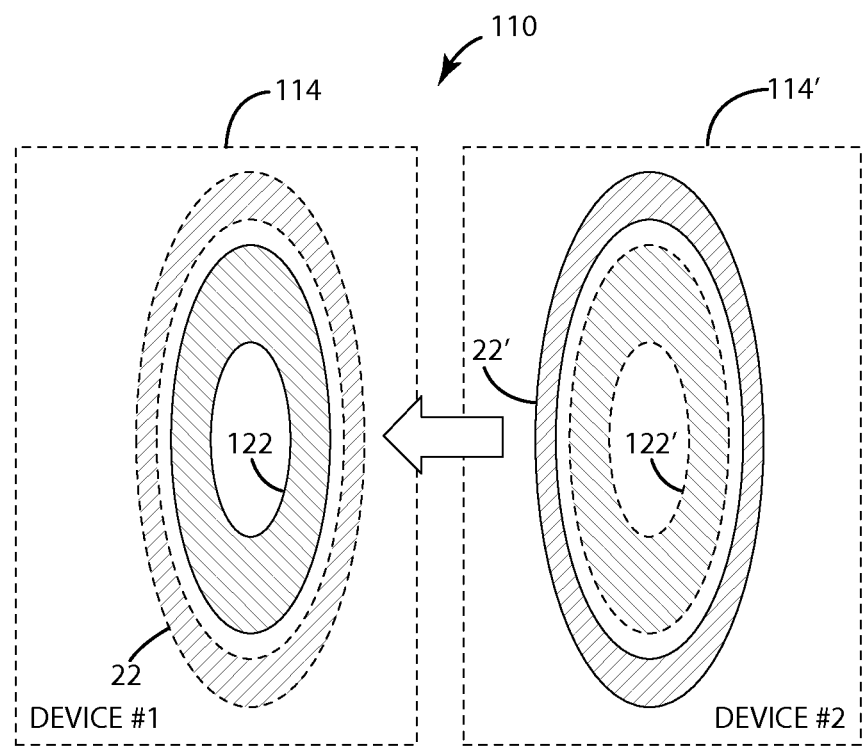
FIG. 13 is a representative view of the remote device and the other remote device, showing power transfer from one to the other, in accordance with the second embodiment of the present invention.

In one embodiment of the remote device 114 shown in FIG. 10, instead of having a switch 37 capable of controlling charging of the battery 38 or the direction of power flow from the battery 38, the remote device 114 may include a DC/DC converter 137 configured to supply power to the transceivers 21, 121 at a rail voltage sufficient for wireless power transfer. The output of the DC/DC converter 137 may be fixed or variable depending on the configuration, similar to the converter 52 of the wireless power supply 12 described with respect to FIGS. 1-8.

The selection of which transceivers 21, 121 to use may depend on the voltage or power requirements of the device being charged or the device requiring power. In some circumstances, two transceivers 21, 121 may be used to enable the remote device 14 to receive inductive power from a longer distance than typical close range inductive systems. For example, both secondaries 22, 122 of remote device 114 are active in the illustrated embodiment of FIG. 11. These secondaries 22, 122 may be wound concentrically around one another, and configured such that one of the secondaries 22, 122 is of a higher inductance than the other 22, 122. When the remote device 114 is receiving power from a wireless power supply 12 or another remote device 114' that is at a longer distance, the remote device 114 may configure one transceiver, such as the secondary transceiver 121, as a resonator and the other transceiver 21 to receive power.

When the remote device 114' is within close proximity and begins to transfer power, the remote device 114 may receive power with either the transceiver 21 or the second transceiver 121, or both, or in other words, with either one or both secondaries 22, 122.

When transmitting power, the remote device 114' may select one or both of its secondaries 22', 122' to transfer power. For example, to ensure that the remote device 114' can transmit enough power, the lowest inductance secondary 22', 122' may be selected to ensure for a given input voltage that the remote device 114' may transmit the maximum amount of power. If the secondary 22', 122' is of a low enough inductance and the battery 38 of the remote device 114' is of high enough voltage, the remote device 114 may not use a voltage boosting circuit, such as DC/DC converter 137, to increase the rail voltage of the wireless power transceiver circuits 30, 130.

In one embodiment, the remote device 114 may select one secondary 22, 122 to receive power if the remote device 114 is using a close-coupled inductive power transfer system. The remote device 114 may select a higher inductance secondary 22, 122 to ensure that the voltage being received is sufficiently high to power the remote device 114. For instance, as shown in the illustrated embodiment of FIGS. 12 and 13, the remote device 114, 114' that is receiving power has selected the secondary 122, 122', which has a higher inductance than the secondary 22, 22'. This configuration may be helpful when the remote device 114 is receiving power from a transmitter (e.g., wireless power supply 10) or a remote device 114' that cannot support the full power requirements of the remote device 114. For example, if the remote device 114 is configured to receive 5 watts but the remote device 114' or transmitter can only supply 2 watts, the magnetic field may not have enough energy to supply the remote device 114 at the desired rectified voltage. By selecting a higher inductance secondary 22, 122, the rectified voltage may be higher for a given magnetic field level and load. This may allow the remote device 114 to provide a high enough voltage to supply power to a given load without using an additional voltage boosting circuit.

Alternatively, the remote device 114 may select multiple secondaries 22, 122 and configure them in parallel in order to further reduce the inductance of the resulting combined transceiver. The resonant capacitors 24, 124 coupled to the secondaries 22, 122 may remain in series or parallel to maintain a similar resonance point as the individual transceivers 21, 121. Additionally, if the remote device 114 is attempting to receive power, it may configure the secondaries 22, 122 in series to increase the overall inductance.

Additionally, in a two secondary 22, 122 (or multi-inductor) solution, when the remote device 14 is trying to transmit power, it may measure the current or voltage on the non-driven secondary 22, 122 to determine the presence of another inductive power transmitter. For example, in a two secondary 22, 122 remote device 114, the remote device 114 may configure the lower inductance secondary 22 to transmit power and the higher inductance secondary 122 as an open circuit. By measuring the voltage induced on the higher inductance secondary 122, the remote device 114 may determine if there is another device attempting to transmit power. The remote device 114 may determine this by measuring the amplitude in the higher inductance secondary 122 and comparing it to a threshold, or by comparing the phase or frequency of the voltage in the higher inductance secondary 122 to the phase of the drive waveform on the transmitting secondary 22. If the phase or frequency does not match a predicted value for a given drive waveform, the remote device 114 may determine that another device is attempting to transmit power and the magnetic field of that transmitting device is strong enough to change the field seen by the non-driven secondary 122. The non-driven secondary 122 may optionally be a resonating coil in which the voltage or current, or both, could be measured to detect another device attempting to transmit power.

E. Third Embodiment

In a third embodiment of the present invention, the wireless power supply system 210 is similar to those described herein, including wireless power supply 12, with several exceptions. The third embodiment may include a wireless power supply 212 similar to the wireless power supply 12 of the illustrated embodiment of FIGS. 1 and 3-7 but with additional circuitry controlling the converter 52.

Figure 14:
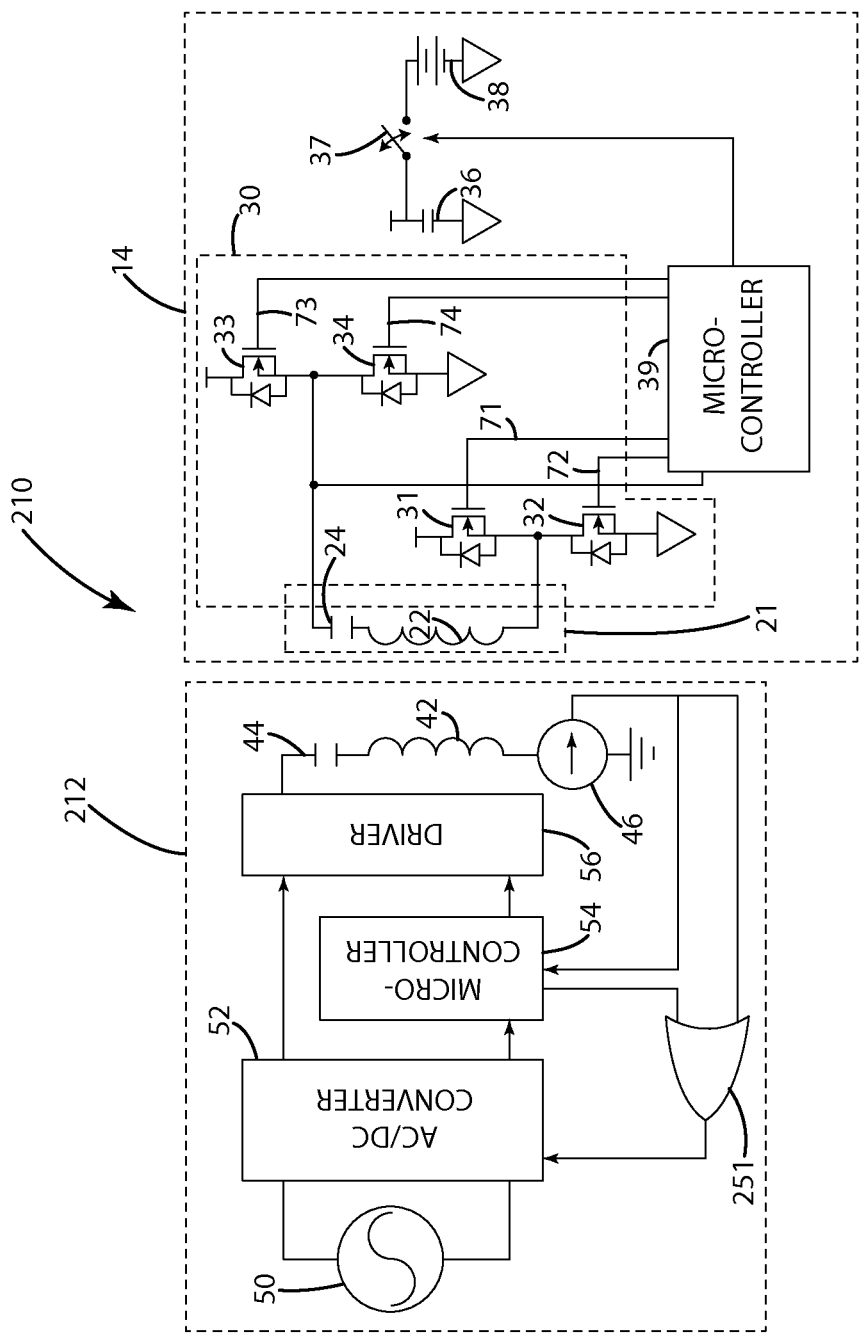
FIG. 14 is a schematic representation of a remote device and a wireless power supply in accordance with a third embodiment of the present invention.
Figure 15:
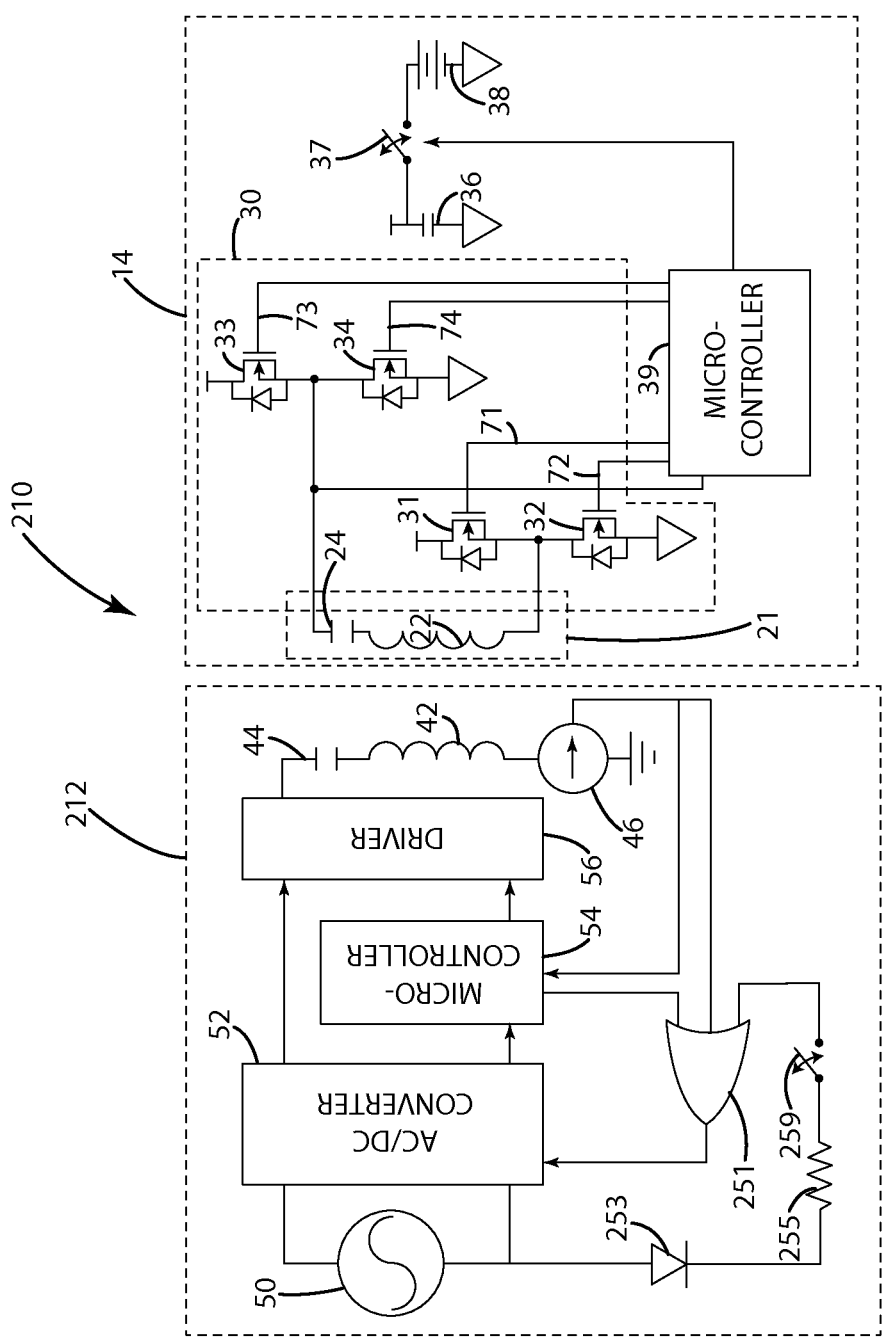
FIG. 15 is schematic representation of the remote device and the wireless power supply in accordance with the third embodiment of the present invention.

The wireless power supply 212 according to this third embodiment is described with respect to the illustrated embodiments of FIGS. 14 and 15. As with the wireless supply 12, the wireless power supply 212 may include a coupler 46 capable of activating the converter 52 in response to power being present in the primary 42. Wireless power supply 212 may further include logic circuitry 251 capable of accepting an input from other sources, enabling activation of the converter 52 or continued activation of the converter 52 from a source other than the coupler 46.

In the illustrated embodiment of FIG. 14, the logic circuitry 251 is an OR gate that accepts outputs from the coupler 46 and the controller 56, but any type of logic circuitry 251 may be used. As before, the coupler 46 may activate the converter 52 but the controller 56 in this embodiment may hold the converter 56 ON while the wireless power supply 212 transmits power. For example, if the converter 52 is activated in response to receiving power from a remote device 14, the controller 56 may initiate transmission of wireless power. There may be circumstances during which the controller 56 stops transmission of power but would still desire to remain in an ON state. In this circumstance, because the remote device 14 may have ceased transmitting power, there may be no power present in the primary 42, potentially allowing the converter 52 to deactivate. Using the OR gate 251, the controller 56 may maintain the wireless power supply 212 in an ON state despite a lack of power in the primary 42.

In the illustrated embodiment of FIG. 15, the logic circuitry 251 is an OR gate that accepts outputs from multiple sources. Two of the sources include outputs from the coupler 46 and controller 56, and operate as described in connection with the illustrated embodiment of FIG. 14. This embodiment may accept one or more additional outputs, allowing activation of the converter 52 based on other sources.

The wireless power supply 212 of the illustrated embodiment of FIG. 15 includes a switch 257 representative of an external source. For example, the switch 257 may be a user operated button switch that enables the user to temporarily power the wireless power supply 212 to start the converter 52. The controller 56 may then hold the converter 52 in the ON state while controlling transmission of power. In another example, the switch 257 may be operated from a separate control channel, such as an input from a separate controller. In a vehicle running from battery power, a wireless power supply 212 may be completely turned OFF to prevent battery drain. To turn ON the wireless power supply, a separate control unit in the vehicle may prompt the wireless power supply 212 to turn ON by temporarily activating the converter 52. Alternatively, the separate control unit may temporarily provide power to the wireless power supply 212, which the controller 56 may detect and enter an ON state.

The illustrated embodiment of FIG. 15 may include diode 253 and resistor 255, or other suitable circuitry, adapted to condition the source 50 for providing an acceptable output to the logic circuitry 251 based on the state of the switch 257. Signals from one or more sources, the coupler 47, or a combination thereof may be combined using any circuitry, including circuitry for electrical ORing such as diodes, MOSFETs, or other typical electrical conditioning circuitry. In addition to or alternatively, the signals may be combined using other logical combinations such as AND, NAND, XOR, XNOR, or any other type of combination where the output of the conditioning circuitry properly controls the converter 52 based on the received inputs.

F. Fourth Embodiment

In a fourth embodiment of the present invention, the wireless power supply system 310 is similar to those described herein, with several exceptions. The fourth embodiment may include a wireless power supply 312 similar to the wireless power supply 12 and a remote device 314 similar to the remote device 14. As mentioned herein, the wireless power supply 312 and the remote device 314 may include circuitry capable of establishing a separate communication link therebetween, such as an NFC link, TransferJet link, or a Bluetooth link. Such a communication link may be formed by a low power communication system, allowing the remote device 314 to locate wireless power supplies using the same methods it uses to locate other types of devices/sensors without using excess power or draining excess power from the battery. For example, the wireless power supply 312 may include an NFC tag 344 and an NFC tag coil 342, and the remote device 312 may include an NFC transceiver 324 and an NFC transceiver coil 322. These components may enable the remote device 314 to activate its NFC transceiver 324 to detect if a wireless power supply 312 is nearby, and in response thereto, automatically activating its transceiver 21 to initiate power transfer. Once power has been applied to the wireless power supply 12 for a predetermined amount of time from the remote device 314, the remote device 314 may remove power and the wireless power supply 12 may begin to transmit power back to the remote device 314.

G. Fifth Embodiment

In a fifth embodiment of the present invention, the wireless power supply system 410 is similar to those described herein, with several exceptions. With reference to the illustrated embodiments of FIGS. 17-20, the fifth embodiment may include a wireless power supply 412 similar to the wireless power supply 12 and may further include a controller converter 451, sensor 453 and driver/rectifier circuitry 456. As mentioned with respect to the illustrated embodiments of FIGS. 1 and 3-7, the wireless power supply 412 may shut down by turning OFF the converter 52. Shutting down the converter 52 may power down the control system 54, preventing it from being able to turn ON the wireless power supply 12 without being provided a power source or external input. Once shut down, the wireless power supply 12 may be turned back ON using inductive energy transmitted from the remote device 14.

Energy received from the remote device 14 may be used to supply power to the rail of the of driver/rectifier 456, which in this embodiment may be configured to operate similar to the wireless power transceiver circuitry 30 of the remote device 14, thereby rectifying power received, either passively or actively, so that it is suitable for powering the wireless power supply 412. That is, the driver/rectifier 456 may be configurable between a transmit mode and a receive mode. It should be understood that this embodiment is not limited to such a configuration, and that the driver/rectifier 456 may not include the capability to be configured in a receive mode in alternative embodiments. For example, the energy received in the driver/rectifier 456 may not be rectified and instead may be used to simply activate the converter 452.

In response to power being supplied to the wireless power supply 412, the controller converter 451 may regulate the power received in order for the controller 54 to operate. In an alternative embodiment, the controller converter 451 may not be present, and the controller 54 may operate from power received directly from the driver/rectifier 456.

In this embodiment, with the controller 54 operating, it may wake the wireless power supply 412 from an OFF state to an ON state by activating the converter 452, thereby enabling power transmission similar to the wireless power supply 12 described with respect to the illustrated embodiments of FIGS. 1 and 3-7. For example, as shown in the illustrated embodiments of FIGS. 19 and 20, the remote device 14 may initiate power transfer to the wireless power supply 412, potentially waking the power supply from an OFF state. The wireless power supply may then begin to transfer power to the remote device 14 so that, for example, the remote device 14 can charge the battery 38. In one embodiment, the wireless power supply 412 may wait until the remote device 14 has ceased power transmission to begin transferring power to the remote device 14.

Sensor 453 may be configured similarly to the coupler 46, and provide feedback to the controller 54 to enable the controller to monitor power in the rectifier/driver 456 and to monitor power from the power source 50, 450. In this way, the controller 54 may determine whether the wireless power supply 412 and other devices are both attempting to transmit power. This process may be similar to the methods described above in connection with the remote device 14. The controller 54 may also determine the power level of the power source 450 in order to decide whether to transfer power or how much power to transfer, or both. The controller may also determine the type of source 50, 450 based on the output of the sensor 453.

In one embodiment, the wireless power supply 412 may be powered by DC source 450, such as a battery, and include a DC/DC converter 452 configured to regulate power from the DC source 450 to a form useable for power transfer. This configuration may be similar to one of the alternative embodiments described herein in connection with the wireless power supply 12, which may be powered from a direct current source rather than an alternating current source.

H. Sixth Embodiment

In a sixth embodiment of the present invention, the remote device 614 is similar to the remote devices described herein with respect to other embodiments, including for example remote device 14. The sixth embodiment includes two-quadrant converter circuitry 637 configured to provide higher voltage to the wireless power transceiver circuitry 30 when the remote device 614 is transmitting power, and a lower voltage to the load or battery 38 when the remote device 614 is receiving power.

When receiving power from a transmitter, such as the wireless power supply 12, it may be beneficial to receive a voltage that is higher than the desired voltage to charge the battery 38 or supply power to the other parts of the remote device 614. By receiving voltage higher than desired, the current in the transceiver 21 may be reduced, potentially increasing the efficiency. Higher voltage may also help if the received voltage is suddenly reduced (e.g., due to changes in coupling, load, or other factors), the wireless transceiver circuitry 30 may use the voltage overhead to continue providing power to the remote device 614.

Additionally, when the remote device 614 begins transmitting power to another remote device 14, the voltage being supplied by the battery 38 may not be high enough to generate sufficient energy to power the other remote device 14. By using the two quadrant converter 637 configured as a two quadrant DC/DC converter, the same converter used to reduce the voltage supplied to the battery 38 can be used to increase the voltage into the wireless power transceiver circuitry 30 by changing its mode of operation.

An example of such two-quadrant converter circuitry 637 is shown in the illustrated embodiments of FIGS. 21-28, which includes a converter inductor 683 and switches 681, 682 capable of being controlled by the controller 39. In this example, two N-channel MOSFETs (Q1 and Q2) are used as switches 681, 682, along with the converter inductor (L1) 683. In the example shown, the switches 681, 682 are controlled by the controller 39, but in an alternative embodiment, the remote device 614 may use a separate controller 686, such a DC/DC converter controller, as shown in the illustrated embodiment of FIG. 28. This separate controller 686 may be controlled by the controller 39.

Figure 22:
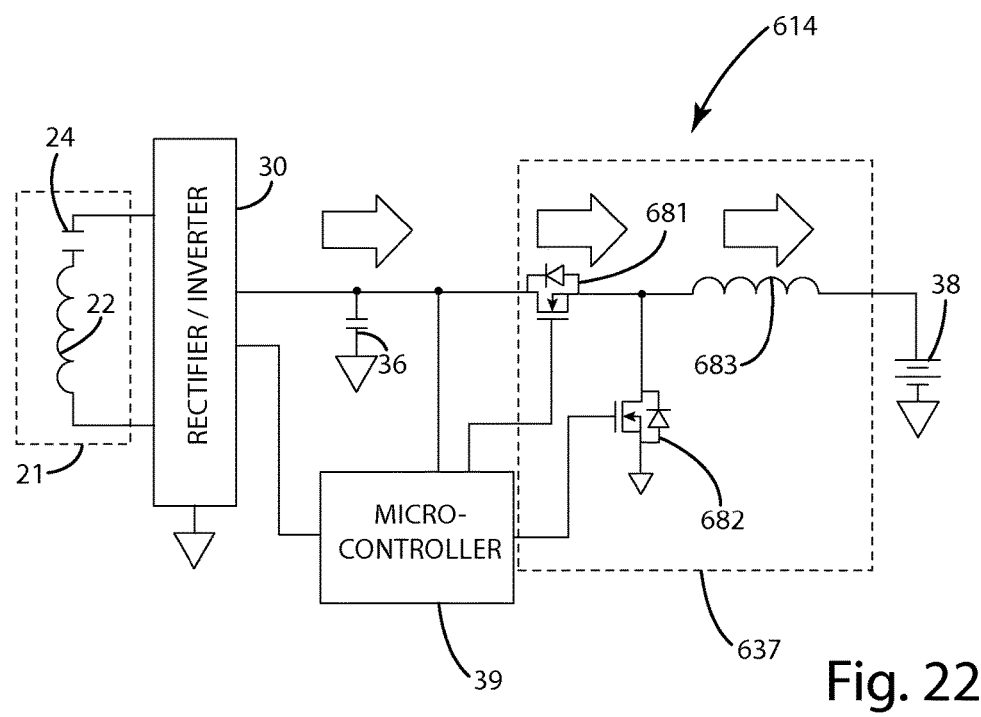
FIG. 22 is a schematic representation of the remote device in a buck mode in accordance with the sixth embodiment of the present invention.
Figure 23:
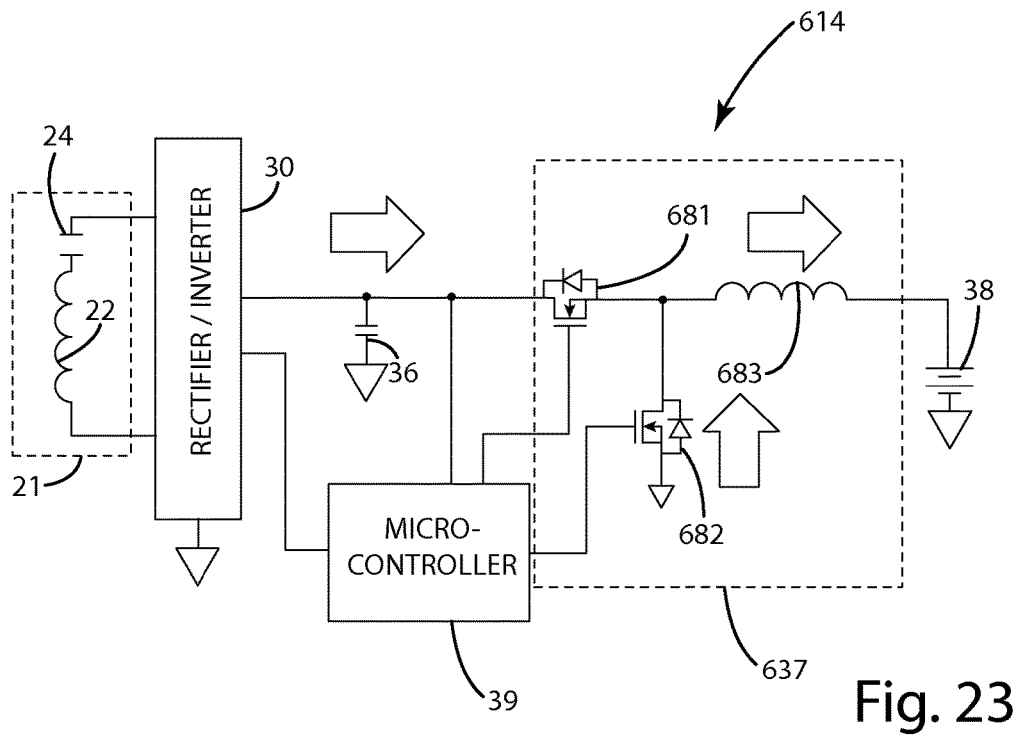
FIG. 23 is a schematic representation of the remote device in a buck mode in accordance with the sixth embodiment of the present invention.

When the remote device 614 is receiving power as shown in FIGS. 22 and 23, it may use the two quadrant converter 637 as a buck converter. In this mode, the controller 39 may communicate to the wireless power supply 12 to adjust power output to a predetermined level. Once at that level, the controller 39 may first turn on switch 681 (Q1). Current then begins to flow out of the wireless power transceiver circuitry 30, through switch 681 (Q1), and through the converter inductor 683 (L1) into the battery 38 or other load as shown in FIG. 22. To prevent the output voltage from getting too high, switch 681 (Q1) may be turned OFF and switch 682 (Q2) may then be turned ON. Because the converter inductor 683 (L1) has energy stored in its magnetic field, the voltage across the converter inductor 683 (L1) reverses, pulling current from the ground reference through the switch 682 (Q2) and through the converter inductor 683 (L1) and into the load 38 as shown in FIG. 23. This cycle may repeat unless the rectified voltage from the wireless power transceiver circuitry 30 goes too low or until the two quadrant converter 637 is turned OFF. In an alternative embodiment, a diode may be added in parallel to the switch 682 (Q2) with the anode connected to the ground reference, potentially eliminating the need to turn on the switch 682 (Q2), and possibly reducing the complexity of the controller 39.

Figure 24:
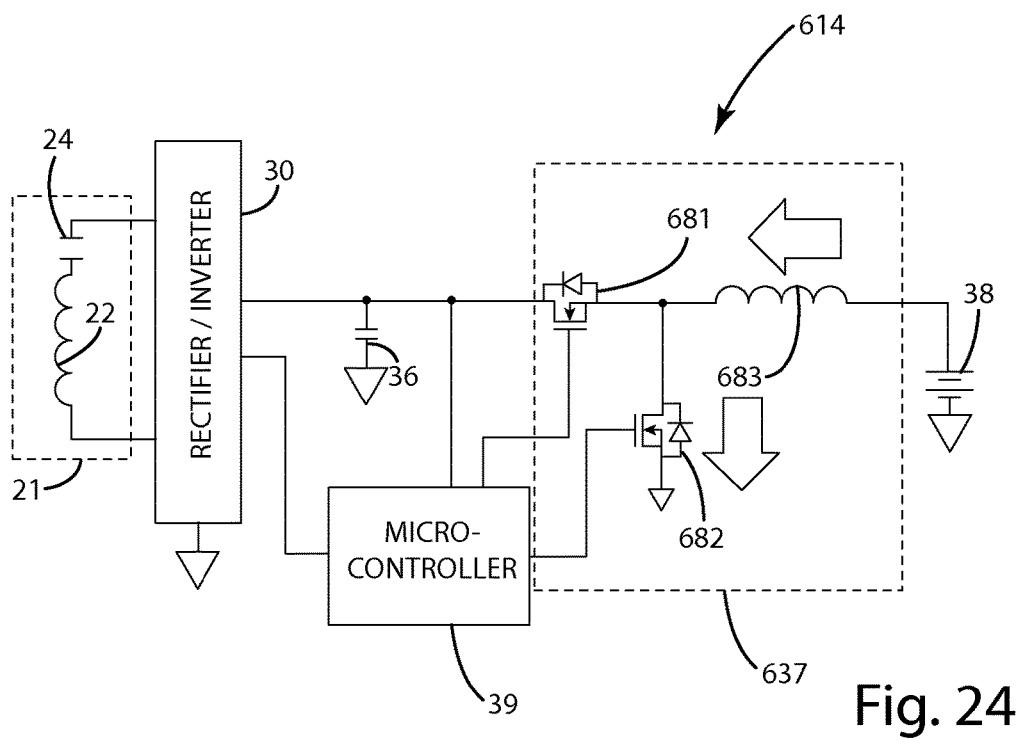
FIG. 24 is a schematic representation of the remote device in a boost mode in accordance with the sixth embodiment of the present invention.
Figure 25:
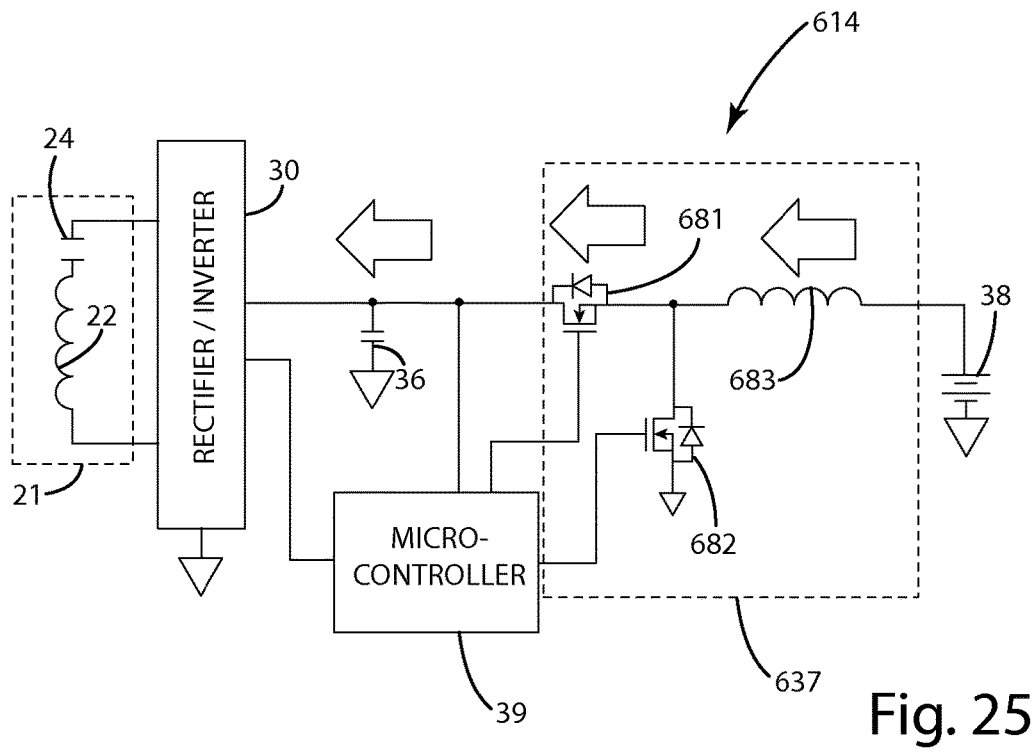
FIG. 25 is a schematic representation of the remote device in a boost mode in accordance with the sixth embodiment of the present invention.
Figure 26:
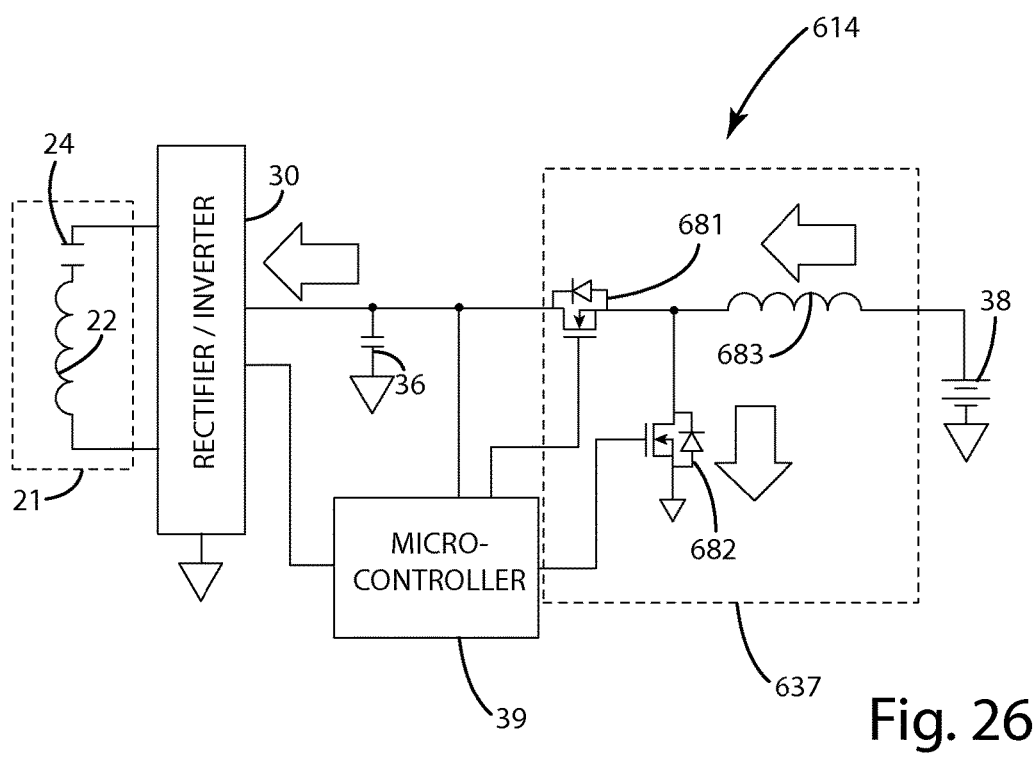
FIG. 26 is a schematic representation of the remote device in a boost mode in accordance with the sixth embodiment of the present invention.
Figure 27:
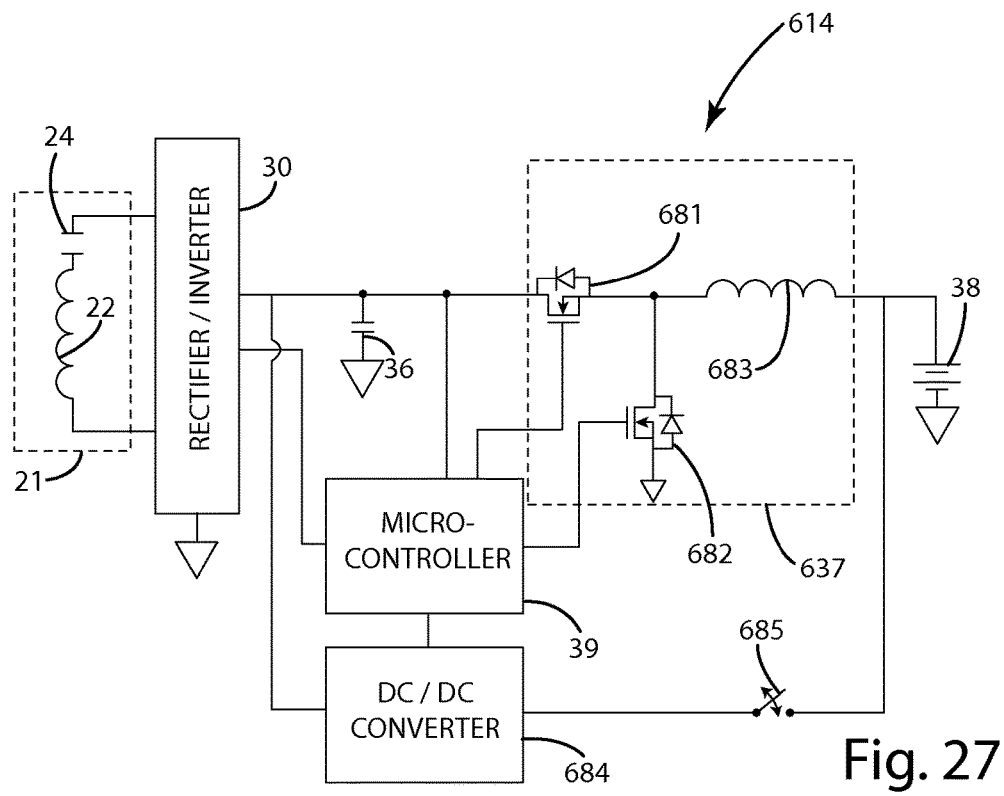
FIG. 27 is a schematic representation of the remote device in accordance with the sixth embodiment of the present invention.
Figure 28:
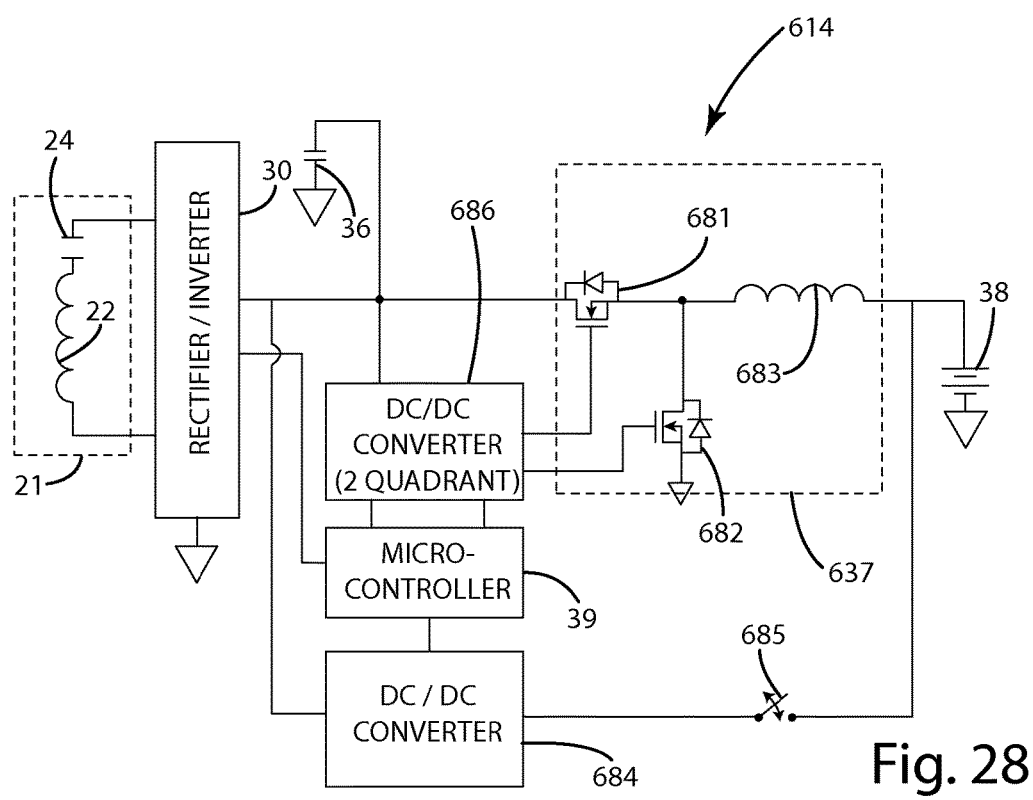
FIG. 28 is a schematic representation of the remote device in accordance with the sixth embodiment of the present invention.

When the remote device 614 is transmitting power to another device as shown in FIGS. 24-26, the two quadrant converter 637 (or two quadrant power supply) may operate as a boost converter. In this configuration, the controller 39 may first turn on switch 682 (Q2), forcing current from the battery 38 through the converter inductor 683 (L1) as shown in FIG. 24. Before the current reaches steady state, the controller 39 may open switch 682 (Q2) and close switch 681 (Q1). The magnetic energy stored in the converter inductor 683 (L1) may cause the voltage across L1 to invert, forcing current through Q1 and into the wireless power transceiver circuitry 30 as shown in FIG. 25. The resulting voltage at the wireless power transceiver circuitry 30 may be higher than the voltage of the battery 38, allowing the remote device 614 to transmit more power to the other device. The switch 682 (Q2) may then be opened and the switch 681 (Q1) may be closed, allowing energy in the converter inductor 683 (L1) to continue to flow to the wireless power transceiver circuitry 30 as shown in FIG. 26. In an alternative embodiment, a diode may be added in parallel to switch 681 (Q1) with its anode connected to the converter inductor 683 (L1). With a parallel diode, switch 681 (Q1) may be left open but current may still flow through the parallel diode. This may reduce complexity of the controller 39, though it may cause an increase in losses.

In either the buck or boost modes, the current flowing through the converter inductor 683 (L1) may be continuous or discontinuous. In buck mode, if the current through the converter inductor 683 (L1) is always in the positive direction (e.g., into the battery 38) and above 0 A, it is said to be in continuous mode. However, if the input voltage is too high or the load current too low, the two quadrant converter 637 may be run in discontinuous mode. In discontinuous mode, switch 681 (Q1) is turned on, and then turned off while the switch 682 (Q2) is turned on. To prevent the current in the converter inductor 683 (L1) from flowing back out of the load 38 and into the ground return, the switch 682 (Q2) may be turned off. However, if the output voltage is higher than required, the switch 681 (Q1) may not need to turn on again right away. Since both switches 681, 682 are off, the current in converter inductor 683 (L1) may go to 0 A. When the two quadrant converter 637 is in boost mode, switch 682 (Q2) may not be turned on immediately after the switch 681 (Q1) if the wireless power transceiver circuitry 30 output voltage is higher than required. In this instance, both switch 681 (Q1) and switch 682 (Q2) may be off, resulting in zero current flowing through the converter inductor 683 (L1).

To switch from buck to boost mode, the controller 39 may reverse the direction of the current in the converter inductor 683 (L1). To do this, the controller 39 may wait until the switch 681 (Q1) is open and the switch 682 (Q2) is closed. Once the switch 682 (Q2) is closed, the controller may leave the switch 682 (Q2) closed until the current in the converter inductor 683 (L1) reverses. Once the current reverses, the controller may open the switch 682 (Q2) and close the switch 681 (Q1), converting the circuit from a buck to a boost mode.

To switch from a boost mode to a buck mode, the controller 39 may wait until the switch 682 (Q2) is open and the switch 681 (Q1) is closed. Once the switch 681 (Q1) is closed, the controller may wait until current flowing in the converter inductor 683 (L1) reverses. Once the current reverses, the controller may open the switch 681 (Q1) and close the switch 682 (Q2), converting the circuit from a boost to a buck mode.

In one embodiment, the controller 39 may be able to convert from boost mode to buck mode and back quickly. This capability may enable two remote devices 614 to negotiate who is transmitting power and who is receiving power without completely stopping power transfer and then having to restart. For example, if the remote device 614 is currently transmitting power, using the two quadrant power supply 637 as a boost converter, and the rectified voltage suddenly goes higher forcing the two quadrant power supply 637 into discontinuous mode or even off completely, the remote device 614 may be able to determine that another remote device 614 is transmitting power to the remote device 614.

If the controller 39 is used to control the two quadrant power supply 637, the controller 39 may be powered in various ways. For example, the controller 39 may be powered directly from the battery 38. Alternatively, the remote device 614 may include a separate voltage converter 684, or DC/DC converter, configured to power controller 39 as shown in the illustrated embodiment of FIGS. 27 and 28. In another alternative embodiment, the controller 39 may receive power from the rectified voltage output of the wireless power transceiver circuitry 30.

And in yet another alternative embodiment, the controller 39 may be powered ON by a switched supply that enables the controller 39 to completely or substantially turn OFF. For example, if the controller 39 is connected to a switch and a switched supply, such as the switch 685 and converter 684 in the illustrated embodiments of FIGS. 27 and 28, the controller 39 and other circuitry for transmitting or receiving wireless power in the remote device 614 may be turned OFF completely, potentially preventing excessive losses in energy while not transferring/receiving. To turn the controller 39 back ON, there may be a button input, a low power timing circuit, or a separate controller within the remote device 614 to control the switch 685. Alternatively, if the controller 39 is primarily powered from the rectified rail of the wireless power transceiver circuitry 30, some power may be received from the battery 38 via current passing through the two quadrant power supply 637 either by closing switch 681 (Q1) or by allowing current to flow through the body diode of the switch 681 (Q1) or a parallel diode (not shown). This may enable the controller 39 to stay powered while waiting to receive or transmit power. If the remote device 614 begins receiving power, the controller 39 may open the switch 681 (Q1) preventing power from initially flowing back into the remote device 614. Alternatively, if the controller 39 is using power flowing through the body diode of the switch 681 (Q1) or a parallel diode, these components may prevent power from initially flowing into the load 38 as well. While the controller 39 may directly control the switches 681, 682 (Q1 and Q2), a driver coupled to the controller 39, or a separate controller dedicated to controlling the two quadrant power supply 37 may also be used.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A remote device capable of receiving and transmitting wireless power, said remote device being separable from a wireless power supply, said remote device comprising:
   a transceiver configured to generate electrical power in response to a field generated by the wireless power supply and to transfer wireless power in response to being driven;
   wireless power transceiver circuitry coupled to said transceiver, said wireless power transceiver circuitry being configurable between a receive mode and a transmit mode;
   wherein in said transmit mode, said wireless power transceiver circuitry is capable of driving said transceiver to transfer wireless power; and
   wherein in said receive mode, said wireless power transceiver circuitry is capable of rectifying said electrical power received in said transceiver from the wireless power supply, wherein said wireless power transceiver circuitry includes self-driven synchronous rectification circuitry.

2. The remote device as claimed in claim 1 wherein said self-driven synchronous rectification circuitry includes one or more active switching elements and biasing circuitry, and wherein a gate of each active switching element is coupled to said transceiver to provide a bias voltage to control a state of each active switching element.

3. The remote device as claimed in claim 2 wherein said biasing circuitry includes one or more capacitors that couple said gate of each active switching element to said transceiver.

4. The remote device as claimed in claim 3 wherein a resistor is also coupled to said gate of each switching element such that each of said gates is biased to a high or low DC voltage.

5. The remote device as claimed in claim 4 further comprising a controller to monitor said wireless power transceiver circuitry, said controller configured to control said wireless power transceiver circuitry to rectify power received from said transceiver in at least one of a full-synchronous mode, a semi-synchronous mode, a discontinuous mode, and a diode rectification mode wherein the controller applies signals that directly couple to each gate of said switching elements.

6. The remote device as claimed in claim 1 further comprising a controller to monitor said wireless power transceiver circuitry, said controller configured to control said wireless power transceiver circuitry to rectify power received from said transceiver in at least one of a full-synchronous mode, a semi-synchronous mode, a discontinuous mode, and a diode rectification mode.

7. The remote device as claimed in claim 6 wherein said wireless transceiver circuitry includes one or more switches coupled to said transceiver, and wherein said controller is capable of driving a gate of each switch to control rectification of power received in said transceiver in said receive mode and to drive said transceiver to transfer wireless power in said transmit mode.

8. The remote device as claimed in claim 1 further comprising:
a sensor coupled to said transceiver, said sensor adapted to sense a characteristic of power in said transceiver;
a controller configured in said transmit mode to control said wireless power transceiver circuitry based on said sensed characteristic of power in order to drive said transceiver.

9. The remote device as claimed in claim 8 wherein said controller is configured to detect if another remote device is transmitting power based on said sensed characteristic of power.

10. The remote device as claimed in claim 1 wherein said wireless power transceiver circuitry includes at least four switches arranged in a bridge topology, said at least four switches capable of being controlled by said self-driven synchronous rectification circuitry to rectify said electrical power received in said transceiver.

11. The remote device as claimed in claim 10 wherein two of said switches are diodes, wherein each diode is a low-side component of said bridge topology.

12. The remote device as claimed in claim 10 wherein each of said switches comprises two back to back MOSFETs.

13. The remote device as claimed in claim 10 wherein in said transmit mode, said bridge topology is operated in a half-bridge mode in order to drive said transceiver.

14. The remote device as claimed in claim 1 further comprising a communication system capable of communication with a second remote device, and wherein said remote device is capable of transferring power to the second remote device.

15. The remote device as claimed in claim 1 wherein said communication system exchanges power information with the second remote device, and wherein said remote device determines whether to enter said transmit mode or said receive mode based on said power information.

16. The remote device as claimed in claim 1 further comprising a second transceiver to at least one of (a) operate as a resonator that couples with said transceiver and (b) selectively activate to receive or transmit power.

17. The remote device as claimed in claim 16 wherein selective activation of said second transceiver includes, in said transmit mode, activating said second transceiver and deactivating said transceiver and, in said receive mode, deactivating said second transceiver and activating transceiver.

18. The remote device as claimed in claim 1 further comprising a two-quadrant power supply capable of operating in a boost mode in said transmit mode and operating in a buck mode in said receive mode.

19. A wireless power supply for transferring power to at least one remote device, said wireless power supply comprising:
a primary for transferring wireless power to the at least one remote device, said primary configured to form an inductive link between said wireless power supply and the at least one remote device;
converter circuitry configured to receive power from a power source and provide power to said primary;
power saving circuitry capable of selectively enabling transmission of power from said power source in response to said wireless power supply receiving wireless power from the at least one remote device, wherein in a disabled state, said primary is disconnected from said power source, wherein said wireless power received by the wireless power supply powers said power saving circuitry to selectively enable transmission of wireless power from said primary using said power from said power source.

20. The wireless power supply as claimed in claim 19 further comprising a coupler operatively coupled to said primary, said coupler providing an input to said power saving circuitry, wherein said power saving circuitry enables transmission of power in response to said input being indicative of power in said primary.

21. The wireless power supply as claimed in claim 20 wherein said coupler is a sensor, and said sensor senses characteristic of power in said primary.

22. The wireless power supply as claimed in claim 19 further comprising a receiver configured to receive wireless power, wherein said power saving circuitry selectively enables transmission of power in response to said receiver receiving wireless power from a remote device.

23. The wireless power supply as claimed in claim 19 wherein said power source is an alternating current source or a direct current source.

24. The wireless power supply as claimed in claim 19 further comprising a controller configured to control transmission of wireless power from said primary.

25. The wireless power supply as claimed in claim 24 wherein said power saving circuitry activates said controller, and wherein said controller controls said converter to provide power from said power source in response to being activated by said power saving circuitry.

26. The wireless power supply as claimed in claim 24 wherein said power saving circuitry includes logic circuitry that enables said controller to maintain said wireless power supply in an enabled state.

27. The wireless power supply as claimed in claim 26 wherein said logic circuitry includes inputs for one or more external sources, said external sources capable of triggering said power saving circuitry to enable transmission of power from said power source.

28. A method of negotiating wireless power transfer between a remote device and a device, the remote device having a transceiver capable of transmitting wireless power in a transmit mode and receiving wireless power in a receive mode, said method comprising:
detecting the device in sufficient proximity to the transceiver of the remote device;
receiving, from the device, device information relating to the device; and
determining based on the device information whether to transmit power in a transmit mode or to receive power in a receive mode.

29. The method of claim 28 wherein the device information includes at least one of a load of the device, a device status, a battery status of the device, a device type, and a maximum amount of available power.

30. The method of claim 28 further comprising:
transmitting, to the device, remote device information relating to the remote device; and
determining whether to operate in a transmit mode or a receive mode based on a comparison between the remote device information and the device information.

31. The method of claim 28 wherein said determining is based on at least one of which of the remote device or the device has more available power, which of the remote device or the device uses more power, which of the remote device or the device has a larger battery, and which of the remote device or the device has a more depleted battery.

32. The method of claim 28 further comprising limiting, in the device, the amount of power received from the remote device.

33. A remote device capable of receiving and transmitting wireless power, said remote device capable of transmitting wireless power from a power source, said remote device comprising:
- a transceiver configured to generate electrical power in response to a field generated by a device and to transfer wireless power in response to being driven;
- wireless power transceiver circuitry coupled to said transceiver, said wireless power transceiver circuitry being configurable between a buck mode and a boost mode;
- wherein in said boost mode, said wireless power transceiver circuitry drives said transceiver with power from the power source, wherein said wireless power transceiver circuitry increases a voltage of the power source to drive said transceiver in said boost mode; and
- wherein in said buck mode, said wireless power transceiver circuitry is capable of rectifying said electrical power received in said transceiver, wherein said wireless power transceiver circuitry decreases a voltage of said power received in said transceiver in said buck mode.

34. The remote device as claimed in claim 33 wherein said wireless power transceiver circuitry is a two-quadrant power supply.

35. The remote device as claimed in claim 33 wherein said wireless power transceiver circuitry includes a converter inductor through which current flows from said transceiver to a load in said buck mode and through which current flows from said power source to said transceiver in said boost mode.

36. The remote device as claimed in claim 33 wherein said wireless power transceiver circuitry is operable in at least one of a continuous mode and a discontinuous mode.

37. The remote device as claimed in claim 36 further comprising a controller configured to:
- detect whether said wireless power transceiver circuitry is operating in said continuous mode or said discontinuous mode; and
- determine, in said boost mode, that the device is transmitting power in response to detecting said wireless power transceiver circuitry operating in said discontinuous mode.

38. The remote device as claimed in claim 33 wherein the device is another remote device or a wireless power supply.

39. The remote device as claimed in claim 33 further comprising a switch operable to disconnect said transceiver and said wireless power transceiver circuitry from the power source.

* * * * *